United States Patent
Inoue et al.

(10) Patent No.: US 10,961,482 B2
(45) Date of Patent: Mar. 30, 2021

(54) ELECTRORHEOLOGICAL FLUID AND ELECTRIC DEVICE

(71) Applicant: ASAHI KASEI KABUSHIKI KAISHA, Tokyo (JP)

(72) Inventors: Akio Inoue, Minoo (JP); Tomoko Kozono, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 211 days.

(21) Appl. No.: 15/781,038

(22) PCT Filed: Dec. 2, 2016

(86) PCT No.: PCT/JP2016/085944
§ 371 (c)(1),
(2) Date: Jun. 1, 2018

(87) PCT Pub. No.: WO2017/094894
PCT Pub. Date: Jun. 8, 2017

(65) Prior Publication Data
US 2019/0284497 A1 Sep. 19, 2019

(30) Foreign Application Priority Data

Dec. 4, 2015 (JP) .................................. 2015-237614
Dec. 4, 2015 (JP) .................................. 2015-237627
(Continued)

(51) Int. Cl.
*C09K 5/00* (2006.01)
*C10M 169/04* (2006.01)
(Continued)

(52) U.S. Cl.
CPC ....... *C10M 169/02* (2013.01); *A63B 21/4035* (2015.10); *A63B 22/0002* (2013.01);
(Continued)

(58) Field of Classification Search
CPC .............. C10M 169/02; C10M 107/38; C10M 107/50; C10M 119/26; C10M 2221/02;
(Continued)

(56) References Cited

U.S. PATENT DOCUMENTS 5,558,803 A * 9/1996 Okada ..................... C08J 3/09
252/572
6,310,604 B1 10/2001 Furusho et al.
6,352,651 B1 * 3/2002 Endo .................. C10M 171/001
252/71

FOREIGN PATENT DOCUMENTS

EP 0636683 A1 2/1995
JP 3-273094 A 12/1991
(Continued)

OTHER PUBLICATIONS

Japanese Office Action dated Feb. 18, 2020, for corresponding Japanese Patent Application No. 2019-017435.
(Continued)

*Primary Examiner* — Prem C Singh
*Assistant Examiner* — Francis C Campanell
(74) *Attorney, Agent, or Firm* — Birch, Stewart, Kolasch & Birch, LLP

(57) ABSTRACT

An electrorheological fluid which comprises a dispersion medium containing fluorine atoms in an amount larger than 0 wt % but not larger than 50.0 wt % and particles for electrorheological fluid use that are contained in the dispersion medium in an amount of 10-50 vol % of the total volume of the dispersion medium and the particles, the particles comprising a sulfonic-acid-group-containing polymer having a sulfonic acid group content of 30-70 wt %.

6 Claims, 10 Drawing Sheets

(30) Foreign Application Priority Data

| Dec. 4, 2015 | (JP) | ................................ | 2015-237640 |
| Aug. 30, 2016 | (JP) | ................................ | 2016-168011 |
| Aug. 30, 2016 | (JP) | ................................ | 2016-168182 |

(51) Int. Cl.

| *C10M 169/02* | (2006.01) |
| *A63B 21/00* | (2006.01) |
| *A63B 22/00* | (2006.01) |
| *C10M 107/38* | (2006.01) |
| *C10M 107/50* | (2006.01) |
| *C10M 119/26* | (2006.01) |
| *F16F 9/20* | (2006.01) |
| *F16F 9/53* | (2006.01) |
| *C10M 151/00* | (2006.01) |
| *G05G 1/04* | (2006.01) |
| *C10M 105/50* | (2006.01) |
| *G06F 3/01* | (2006.01) |
| *B25J 19/02* | (2006.01) |
| *G05G 5/03* | (2008.04) |
| *A63F 13/285* | (2014.01) |
| *A63F 13/245* | (2014.01) |
| *A63F 13/818* | (2014.01) |
| *C10N 30/00* | (2006.01) |
| *C10N 40/08* | (2006.01) |
| *C10N 50/00* | (2006.01) |

(52) U.S. Cl.
CPC ............. *A63F 13/285* (2014.09); *B25J 19/02* (2013.01); *C10M 105/50* (2013.01); *C10M 107/38* (2013.01); *C10M 107/50* (2013.01); *C10M 119/26* (2013.01); *C10M 151/00* (2013.01); *C10M 169/04* (2013.01); *F16F 9/20* (2013.01); *F16F 9/53* (2013.01); *G05G 1/04* (2013.01); *G05G 5/03* (2013.01); *G06F 3/01* (2013.01); *A63B 2022/0094* (2013.01); *A63F 13/245* (2014.09); *A63F 13/818* (2014.09); *C10M 2213/023* (2013.01); *C10M 2213/0606* (2013.01); *C10M 2221/02* (2013.01); *C10M 2229/0415* (2013.01); *C10N 2030/60* (2020.05); *C10N 2040/08* (2013.01); *C10N 2050/015* (2020.05)

(58) Field of Classification Search
CPC ...... C10M 2229/0415; C10M 169/041; C10M 2205/04; C10M 2213/003; C10M 2213/043; C10M 151/00; C10M 169/04; C10M 105/50; F16F 9/53; G05G 1/04; G05G 5/03; G06F 3/01; B25J 19/02; A63F 13/245; A63F 13/818; A63F 13/285; C10N 2230/60; C10N 2240/08; C10N 2230/02; C10N 2220/021; C10N 2240/202; C10N 2240/20; A63B 21/4035; A63B 22/0002; A63B 2022/0094
USPC .................................. 508/215; 252/78.3, 73
See application file for complete search history.

(56) References Cited

FOREIGN PATENT DOCUMENTS

| JP | 5-112793 A | 5/1993 |
| JP | 5-209185 A | 8/1993 |
| JP | 5-230491 A | 9/1993 |
| JP | 7-64649 A | 3/1995 |
| JP | 7-173487 A | 7/1995 |
| JP | 7-190099 A | 7/1995 |
| JP | 2000-144165 A | 5/2000 |
| JP | 2001-311789 A | 11/2001 |
| JP | 2003-322196 A | 11/2003 |
| WO | WO 96/002887 A1 | 2/1996 |

OTHER PUBLICATIONS

International Preliminary Report on Patentability and Written Opinion of the International Searching Authority (Forms PCT/IB/338, PCT/IB/373 and PCT/ISA/237) for International Application No. PCT/JP2016/085944, dated Jun. 14, 2018.
International Search Report (Form PCT/ISA/210) for International Application No. PCT/JP2016/085944, dated Jan. 10, 2017.

\* cited by examiner

ELECTRORHEOLOGICAL FLUID AND ELECTRIC DEVICE

FIELD

The present invention relates to an electrorheological fluid which reversibly changes in viscosity upon application of voltage and to an electric device using the same.

BACKGROUND

An electrorheological (ER) fluid is a fluid which reversibly changes in rheological characteristic upon application of an electric field. Clutches, brakes, dampers, haptic devices, rehabilitation apparatuses, and other devices and apparatuses making use of the high level of its response have been proposed.

As such an electrorheological fluid exhibiting a large electrorheological effect enabling use for such applications, up until now, for example, a fluid comprised of sulfonated polystyrene particles dispersed in silicone oil has been proposed (Patent Literature 1).

When using an electrorheological fluid for such applications, it is required that the shear stress when applying an electric field be large and also that the base viscosity (viscosity when not applying an electric field) be low and a difference between stress when not applying an electric field and applying it be large. The dispersion stability of the particles is also one of the important characteristics demanded. If the dispersion stability of the particles is poor, the stability of the electrorheological effect at the time of application of voltage is also affected. On this point, the art described in Patent Literature 1 tends to be low in dispersion stability and high in base viscosity and had the problem that a sufficiently high electrorheological effect (ER effect) was difficult to obtain.

The change in viscosity of an electrorheological fluid is substantially proportional to the square of the electric field intensity applied. To obtain a shear stress able to be applied to various device applications, application of a high voltage of several kV/mm is considered necessary. To operate these electric devices with as low a voltage as possible, for example, the method of narrowing the electrode gap and the method of giving relief shapes to the electrodes to suppress slippage between the electrorheological fluid and the electrode surfaces (Patent Literatures 2 to 4) have been proposed.

Among the above methods, the method of narrowing the electrode gap has the following difficulties.

In the production of an electric device using an electrorheological fluid, a process is adopted in which, first, the device is assembled, and then the electrorheological fluid is filled in the electrode gap. Therefore, if the electrode gap is narrowed, filling the fluid between the electrodes becomes extremely difficult. If filling the electrorheological fluid between the electrodes, the possibility of bubbles remaining in the electrode gap becomes higher. If bubbles remain, the problem of the dielectric breakdown voltage easily dropping, spatter occurring, and the electrorheological fluid deteriorating and the problem of the performance of the device becoming unstable occur. In particular, these tendencies are remarkable in the case of an electrorheological fluid in which particles are dispersed.

To prevent the above phenomenon, for example, the technique of degassing the electrorheological fluid in advance has been proposed (Patent Literature 5). However, even if the electrorheological fluid itself is degassed, when filling the electrorheological fluid in a narrow electrode gap, entry of bubbles is unavoidable.

In the known art for operating electric devices using an electrorheological fluid at a low voltage, when studying the technique of giving relief shapes to the electrodes, cases were seen in which even if giving relief shapes to the electrodes, the electrorheological effect was not improved much at all. Depending on the extent of the relief shapes, a tendency arose for dielectric breakdown to occur more easily than when the electrodes are flat. This dielectric breakdown is believed to occur due to bubbles entering into the relief shape parts of the electrode surfaces when injecting the electrorheological fluid and sparks being generated when applying a high voltage. If bubbles enter into interfaces between the electrodes and the electrorheological fluid, sometimes slippage similar to the hydroplaning phenomenon occurs between the two.

On this point, even if degassing the electrorheological fluid in advance in accordance with Patent Literature 5, in devices with a narrow electrode gap, in particular in devices with extremely complicated electrode shapes, it is difficult to avoid bubbles remaining in the electrode gap. The above problem is still not solved.

CITATION LIST

Patent Literature

Patent Literature 1: Japanese Patent Publication No. H07-173487A
Patent Literature 2: Japanese Patent Publication No. H07-064649A
Patent Literature 3: Japanese Patent Publication No. 2000-144165A
Patent Literature 4: Japanese Patent Publication No. 2001-311789A
Patent Literature 5: Japanese Patent Publication No. H05-112793A

SUMMARY

Technical Problem

The present invention was made so as to try to improve this situation.

Therefore, one of the technical problems of the present invention is to provide an electrorheological fluid with a base viscosity which is sufficiently low and exhibiting a high ER effect.

Another technical problem of the present invention is to provide an electric device using an electrorheological fluid wherein a high shear stress is obtained even if the applied voltage is low, dielectric breakdown and the slip phenomenon do not easily occur, and the reliability is high.

The inventors engaged in in-depth research so as to try to solve the above problems. In the process, they discovered that in an electric device using an electrorheological fluid, when transmitting motion of a drive motor to an electrorheological fluid, sometimes a so-called "stick-slip phenomenon" occurs.

The "stick-slip phenomenon" means the phenomenon where, for example, the drive force of a motor driving rotation is not continuously transmitted to an electric device and therefore the electric device repeatedly stops and is driven in a pulsating manner.

In an apparatus provided with a power transmission system for transmitting a rotational force of a motor to an electric device, the device is not driven until the rotational torque of the motor exceeds a static frictional force of the device. The device begins rotating when the torque of the motor overcomes the static frictional force of the device. However, this rotation exceeds the balance with the dynamic frictional force of the device resulting in overshoot. This being so, despite the motor continuing to continuously rotate, the device again stops in trying to eliminate this overshoot state and the static frictional force becomes dominant. If the torque of the motor again overcomes the static frictional force of the device, the device again starts rotating.

If the stick-slip phenomenon occurs, due to the above such mechanism, the device repeatedly stops and operates in a pulsating manner.

Such a stick-slip phenomenon is particularly remarkable when a plurality of types of materials differing in rigidity or flexibility are used in a power transmission system. Therefore, when an electric device is used, for example, as a haptic device used for rehabilitation, a problem may arise.

Therefore, still another technical problem of the present invention is to provide an electric device using an electrorheological fluid while suppressing the occurrence of pulsation due to the stick-slip phenomenon.

Solution to Problem

The inventors, in consideration of the above problems, studied the composition of an electrorheological fluid and the state of electrodes at an electric device and as a result discovered solutions to the problems by the following means:

[1] An electrorheological fluid comprising:
a dispersion medium containing fluorine atoms in an amount of over 0 wt % and 50.0 wt % or smaller in which
particles for electrorheological fluid containing a sulfonic acid group-containing polymer having a content of sulfonic acid groups of 30 wt % or greater and 70 wt % or smaller are contained in an amount of 10 vol % or greater and 50 vol % or smaller with respect to the total volume of the dispersion medium and the particles.

[2] The electrorheological fluid according to [1], wherein the dispersion medium contains fluorine atoms in an amount of 38.0 wt % or greater and 41.5 wt % or smaller.

[3] The electrorheological fluid according to [1] or [2], wherein the sulfonic acid group-containing polymer has a sulfonated aromatic structure.

[4] The electrorheological fluid according to any one of [1] to [3], wherein the content of the chlorine atoms in the particles for electrorheological fluid is 5,000 ppm or smaller.

[5] The electrorheological fluid according to any one of [1] to [4], wherein the content of the chlorine atoms in the particles for electrorheological fluid is 1 ppm or greater.

[6] An electrorheological fluid comprising
a dispersion medium containing fluorine atoms in which
particles for electrorheological fluid containing a sulfonic acid group-containing polymer are contained, wherein
an electrorheological effect X expressed by the following formula (1) is 140 or greater:

$$X = S_1/S_0 \tag{1}$$

(in which formula (1), $S_1$ is a shear stress when applying a 3.0 kV/mm electric field, while $S_0$ is a shear stress when not applying an electric field)

[7] Particles for electrorheological fluid containing a sulfonic acid group-containing polymer, in which particles for electrorheological fluid, the content of the sulfonic acid groups in the particles for electrorheological fluid is 30 wt % or greater, and
the content of the chlorine atoms in the particles for electrorheological fluid is 1 ppm or greater and 5,000 ppm or smaller.

[8] An electrorheological fluid comprised of a dispersion medium containing fluorine atoms in which particles according to [7] are contained.

[9] An electric device comprised of an electrorheological fluid which is comprised of a dispersion medium in which particles for electrorheological fluid are contained and which is filled between a pair of electrodes, in which electric device,
in a region of at least part of at least one surface of the surfaces of the pair of electrodes facing each other, an arithmetic mean roughness (Ra) is 0.5 μm or greater and less than 300 μm and a mean length (RSm) of roughness curve elements is 10 nm or greater and less than 100 μm.

[10] The electric device according to [9], wherein a gap between the pair of electrodes is 0.1 mm or greater and 0.5 mm or smaller.

[11] The electric device according to [9] or [10], wherein the electrorheological fluid is an electrorheological fluid according to any one of [1] to [6].

[12] The electric device according to any one of [9] to [11], constituting a brake, clutch, or haptic device.

Advantageous Effects of Invention

According to the present invention, an electrorheological fluid having a base viscosity which is sufficiently low and able to express a high ER effect and a device in which a high shear stress is obtained even by application of a low voltage, in which dielectric breakdown and the slip phenomenon hardly ever occur, and the reliability is high, are provided.

DESCRIPTION OF EMBODIMENTS

Figure 1:
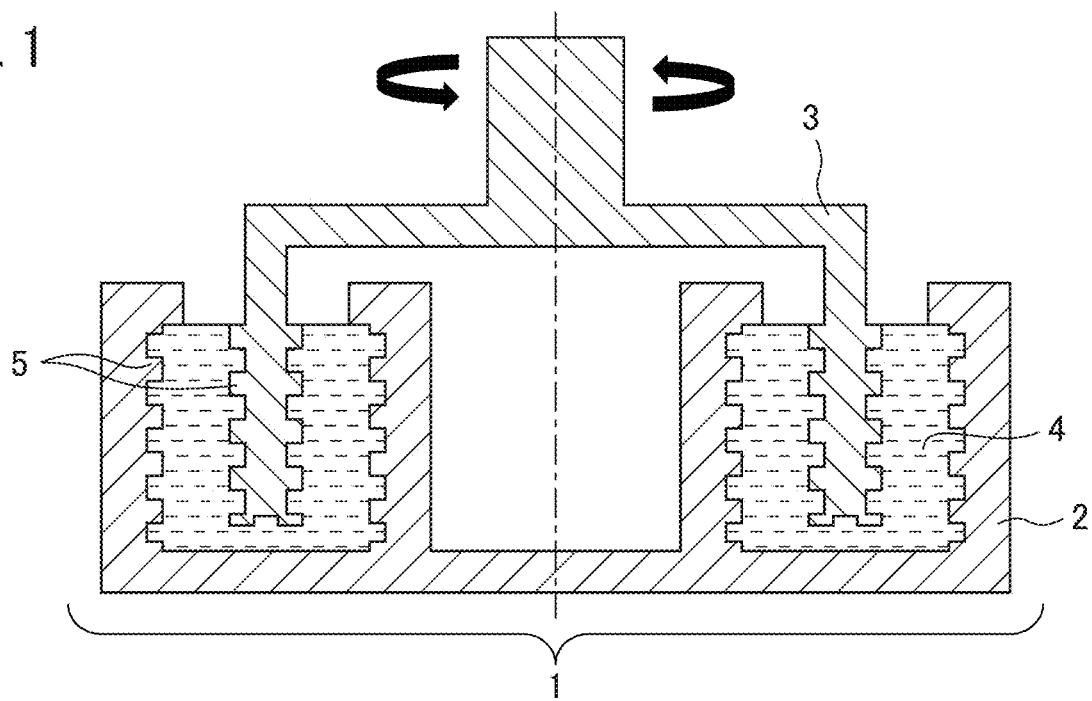
FIG. 1 is a conceptual view of one example of an embodiment of an electric device of the present invention as constituted by a brake using an electrorheological fluid.

The electrorheological fluid of the present invention comprises a dispersion medium containing fluorine atoms in which particles for electrorheological fluid containing a sulfonic acid group-containing polymer are contained.

Dispersion Medium

First, the dispersion medium will be explained.

The dispersion medium used in the electrorheological fluid of the present invention contains fluorine atoms.

The content of the fluorine atoms in the dispersion medium in the electrorheological fluid of the present invention is preferably over 0 wt % and 50.0 wt % or smaller. This value is more preferably 5.0 wt % or greater, 10.0 wt % or greater, 20.0 wt % or greater, or 38.0 wt % or greater and 50.0 wt % or smaller, 47.0 wt % or smaller, 45.0 wt % or smaller, 41.5 wt % or smaller, or 41.0 wt %.

An electrorheological fluid comprised of a dispersion medium having a content of fluorine atoms of over 0 wt % and 50.0 wt % or smaller in which particles for electrorheological fluid containing a sulfonic acid group-containing polymer having a content of sulfonic acid groups of 30 wt % or greater and 70 wt % or smaller are dispersed is low in base viscosity and exhibits an excellent ER effect.

The fluorine content in the dispersion medium can be measured by a suitable technique such as elemental analysis.

The fluorine source of the fluorine atoms in the dispersion medium is a fluorine-based oil.

A fluorine-based oil can be used without particularly limitation so long as an electrically insulating oil containing fluorine atoms. As this fluorine-based oil, for example, a low polymer of ethylene trifluoride used in general for lubricants or mold release agents; a perfluoro polyether oil used in general for lubricants; and a fluorine-modified silicone oil used for lubricants may be mentioned. As the fluorine-based oil in the present invention, a low polymer of trifluorochloroethylene is preferable.

The fluorine-based oil preferably has a fluorination degree of a ratio of the number of atoms of fluorine contained in it as a numerator and the number of atoms of carbon as a denominator of 1.0 to 2.0 in range, more preferably 1.5 to 2.0 in range.

The fluorine-based oil preferably has a dynamic viscosity at 25° C. of 1 cSt to 50 cSt, more preferably 1 cSt to 20 cSt.

The fluorine-based oil preferably has a specific gravity of 1.7 to 2.0, more preferably 1.8 to 1.9.

The fluorine oil preferably has a weight average molecular weight of 300 to 700, more preferably 400 to 600.

To adjust the content of the fluorine atoms in the dispersion medium of the electrorheological fluid of the present invention to the above range, it is possible to select a fluorine-based oil which itself contains an amount of fluorine atoms in the above range or to mix another dispersion medium with the fluorine-based oil to adjust the medium to the above range.

The other dispersion medium mixed together with the fluorine-based oil is not particularly limited so long as being an electrically insulating oil and forming a mixed solvent due to compatibility with a fluorine-based oil. For example, polydimethylsiloxane, partially octyl-substituted polydimethylsiloxane, partially phenyl substituted polydimethylsiloxane, or other silicone oil; liquid paraffin, decane, methylnaphthalene, decalin, diphenylmethane, partially hydrogenated triphenyl, and other hydrocarbons; chlorobenzene, dichlorobenzene, bromobenzene, chlorobiphenyl, chlorodiphenylmethane, and other halogenated hydrocarbons; dioctyl phthalate, trioctyl trimellitate, dibutyl sebacate, and other ester compounds may be mentioned. One type or two types or greater selected from among these may be selected for use. In the present invention, as the other dispersion medium mixed together with the fluorine-based oil, silicone oil is preferable, while polydimethylsiloxane is particularly preferable.

The other dispersion medium preferably has a dynamic viscosity at 25° C. of 10 cSt to 50 cSt, more preferably 10 cSt to 30 cSt.

The other dispersion medium preferably has a specific gravity of 0.7 to 1.0, more preferably 0.9 to 1.0.

The weight average molecular weight of the other dispersion medium is preferably 1,000 to 5,000, more preferably 1,000 to 3,000.

Particles

Next, the particles will be explained.

The particles used in the electrorheological fluid of the present invention are particles for electrorheological fluid including a sulfonic acid group-containing polymer.

As the particles used in the electrorheological fluid of the present invention, the following two cases are preferable:

(1) Case of particles 1 for electrorheological fluid containing a sulfonic acid group-containing polymer having a content of sulfonic acid groups of 30 wt % or greater and 70 wt % or smaller and (2) Case of particles 2 for electrorheological fluid containing a sulfonic acid group-containing polymer, wherein the content of sulfonic acid groups in the particles 2 for electrorheological fluid is 30 wt % or greater and the content of the chlorine atoms in the particles 2 for electrorheological fluid is 1 ppm or greater and 5,000 ppm or smaller.

An electrorheological fluid comprised of a dispersion medium containing fluorine atoms in which particles 2 for electrorheological fluid containing chlorine atoms are dispersed is low in base viscosity regardless of the content of the fluorine atoms in the dispersion medium and therefore can exhibit an excellent ER effect. This tendency is more remarkable when the content of chlorine in the particles is 1 ppm or greater.

On the other hand, an electrorheological fluid comprised of a dispersion medium containing fluorine atoms in which particles 1 for electrorheological fluid are dispersed has a low base viscosity and can exhibit an excellent ER effect when the content of fluorine atoms in the dispersion medium is over 0 wt % and 50.0 wt % or smaller even when the particles do not contain chlorine atoms. The particles 1 for electrorheological fluid may contain chlorine atoms or not contain them.

Therefore, the particles used in the electrorheological fluid of the present invention preferably contains one type of particles or greater selected from the above particles 1 for electrorheological fluid and the particles 2 for electrorheological fluid.

The particles 1 and 2 for electrorheological fluid of the present invention may respectively be particles containing only a sulfonic acid group-containing polymer as a polymer or particles comprised of particles of a different material forming the cores and a sulfonic acid group-containing polymer coated on the surfaces of the cores. The core particles, for example, may be suitably selected from a resin material and inorganic material in accordance with the objective. Due to use of the core particles, for example, improvement of the dispersion stability due to making the specific gravity of the particles match the specific gravity of the dispersion medium, adjustment of the particle diameter, improvement of the electrorheological effect due to making the shape other than a spherical one can be achieved. As the core material, for example, porous polymer particles of cross-linked polystyrene and polyamide and porous silica particles are suitable.

The sulfonic acid groups can be present inside the particles and on their surfaces. However, at least part of the sulfonic acid groups have to be present at the particle surfaces. In the electrorheological fluid of the present invention, even if using particles in which sulfonic acid groups are present inside, the electrorheological effect can be exhibited. However, having as many sulfonic acid groups as possible be present on the particle surfaces is preferable from the viewpoint of exhibiting a higher electrorheological effect. The amount of sulfonic acid groups present on the particle surfaces should be suitably set in accordance with the polymer used, core material, and particle diameter and cannot be specified across the board. However, for example, if forming a styrene-sulfonic acid polymer in which one each sulfonic acid group is introduced into all of the aromatic rings of the polystyrene into true spheres of a particle diameter of 10 μm and having sulfonic acid groups present on the surfaces of all particles, the amount of presence of sulfonic acid groups at the particle surface is calculated as 0.014 mol/m$^2$.

The sulfonic acid group-containing polymer used in the present invention is selected from polymers having sulfonic acid groups and polymers in which the protons of part or all of the sulfonic acid groups introduced to them are substituted with other cations and become sulfonates. As cations with which the protons are substituted, for example, alkali metal ions, alkali earth metal ions, IIIA group metal ions, IVA group metal ions, transition metal cationic species, and organic cations may be mentioned. As specific examples of these, as alkali metal ions, for example $Na^+$ and $K^+$; as alkali earth metal ions, for example $Mg^{2+}$ and $Ca^{2+}$; as IIIA group metal ions, for example $Al^{3+}$; as IVA group metal ions, for example, $Sn^{2+}$ and $Pb^{2+}$; as transition metal cationic species, for example, $Zn^{2+}$, $Fe^{2+}$, and $Fe^{3+}$; and as organic cations, for example, ammonium ions, organic quaternary ammonium ions, pyridinium ions, and guanidium ions may be mentioned. One type or more selected from among these may be used. The protons are substituted by, for example, neutralization, ion exchange, or other operations.

The particles used in the electrorheological fluid of the present invention have a weight of sulfonic acid groups with respect to the weight of the sulfonic acid group-containing polymer in the particles of 30 wt % or greater, preferably 30 to 70 wt %. The content of sulfonic acid groups with respect to the weight of the sulfonic acid group-containing polymer is preferably 45 to 70 wt %, more preferably 50 to 70 wt %. If the content of the sulfonic acid groups is large, there is a tendency for the electrorheological effect to be improved, but if becoming larger than the above-mentioned upper limit value, sometimes there is an effect on the stability over time.

As explained above, the "sulfonic acid groups" in the present invention include both sulfonic acid groups ($—SO_3H$) and sulfonates ($—SO_3(X)_n$, where X is a cation and "n" is calculated by (1÷valence of cations X)). Therefore, the weight ratio of the sulfonic acid groups becomes the ratio of the sum of the weights of the $—SO_3H$ part and $—SO_3(X)_n$ part with respect to the weight of the sulfonic acid group-containing polymer.

The sulfonic acid groups (sulfonates) can be quantified by titration, elemental analysis, or other suitable means, but quantification by elemental analysis is preferable. The weight of the sulfonic acid group-containing polymer contained in the particles, for example, can be quantified by the following procedure:

First, GC-MASS or IR is used to investigate the structure and content of the polymer used and find the ratio of content of the sulfonic acid group-containing polymer in it. If the particles are comprised of only the polymer, the weight of the sulfonic acid group-containing polymer can be quantified from the above-mentioned ratio of content. If inorganic particles are used as the core material, a solvent is used to dissolve and extract only the sulfonic acid group-containing polymer or differential calorimetry is used to measure the rate of reduction of weight up to a temperature at which the organic components completely burn off or a higher temperature. Quantification is possible from that rate of reduction of weight and the above-mentioned ratio of content of the polymer. If a different type of resin is used as the core material, a method similar to quantification of the sulfonic acid group-containing polymer can be used to determine the composition by weight of the sulfonic acid group-containing polymer and the other resin and then calculation can be used for quantification.

The electrorheological fluid of the present invention becomes extremely good in dispersion stability and gives a high electrorheological effect by using particles containing sulfonic acid groups in an amount of 30 to 70 wt % with respect to the weight of the sulfonic acid group-containing polymer.

The electrorheological fluid of the present invention containing such particles further is low in base viscosity in the non-voltage application state, so the electrorheological magnification (difference from viscosity at time of application of voltage) becomes larger. Therefore, an electric device using that fluid can provide much greater contrast in sense of force even with a low voltage.

The "sulfonic acid group-containing polymer" referred to in the present invention refers to a polymer with sulfonic acid groups bonded to the polymer chain. For example, a sulfonated aromatic vinyl polymer, acrylsulfonic acid polymer, and sulfonated phenolformaldehyde polymer may be mentioned.

The sulfonic acid group-containing polymer used in the present invention may be one in which the sulfonic acid groups are directly bonded to the main chain of the polymer and one in which sulfonated aromatics are bonded to the main chain or a side chain. In particular, one in which sulfonated aromatics are bonded to a side chain is suitably used.

Such a polymer used in the present invention is preferably a homopolymer comprised of an aromatic compound monomer (A) mentioned below or a copolymer comprised of the aromatic monomer (A) and divinyl compound (B) and, if necessary, a vinyl compound monomer (C) added.

As the aromatic compound monomer (A), for example, an alkyl styrene compound, vinyl monoalkyl naphthalene compound, phenol, and melamine and their halogen compounds, alkoxy compounds, and aryloxy compounds may be mentioned. One type or two types or more selected from among these may be used. Specifically, there are styrene, methoxystyrene, dimethoxystyrene, ethoxystyrene, methoxymethylstyrene, methylstyrene, and chlorostyrene.

As the divinyl compound (B), there are, for example, a divinyl aromatic hydrocarbon and a divinyl aliphatic hydrocarbon. This divinyl compound (B) is mainly used as a cross-linking agent at the time of polymerization of a vinyl aromatic compound monomer. Specifically, for example, divinylbenzene, divinylethylbenzene, ethyleneglycol di(meth)acrylate, and formaldehyde may be mentioned. One type or two types or greater selected from among these may be used.

As the other vinyl compound monomer (C), for example, an olefin-based hydrocarbon and its halogen substituted derivatives, an ester compound of an unsaturated carboxylic acid, a vinyl ester compound of a monovalent carboxylic acid, an unsaturated amide compound and its derivatives, an unsaturated cyan compound, unsaturated alcohol compound, and an unsaturated dibasic acid (for example, a monoester compound of a monovalent alcohol and unsaturated dibasic acid) may be mentioned. One type or two types or greater selected from among these may be used.

As the ratio of use of the monomers, the following ranges are recommended:
Aromatic compound monomer (A): Preferably 50.0 wt % or greater, more preferably 60.0 to 99.9 wt %, in particular 80.0 to 99.8 wt %;
Divinyl compound (B): Preferably 50.0 wt % or smaller, more preferably 0.1 to 40.0 wt %, in particular 0.1 to 20.0 wt %;
Other vinyl compound monomer (C): Preferably 50.0 wt % or smaller, more preferably 0.1 to 40.0 wt %, in particular 0.1 to 20.0 wt %

The sulfonic acid group-containing polymer in the present invention may be cross-linked or not cross-linked, but cross-linked is preferable from the viewpoint of the particle lifetime. As the method of cross-linking that sulfonic acid group-containing polymer, the method of copolymerizing the above divinyl compound (B) may be mentioned.

The polymer containing the aromatic compound monomers in the present invention may be sulfonated by, for example, the technique of bringing it into contact with sulfuric acid, fuming sulfuric acid, sulfur trioxide, chlorosulfuric acid, fluorosulfuric acid, amidosulfuric acid, or another sulfonating agent.

The particles for electrorheological fluid of the present invention may also contain chlorine atoms.

The content of the chlorine atoms in the particles for electrorheological fluid is preferably 5,000 ppm or smaller based on the weight of the particles. More preferably it is 1 ppm or greater and 5,000 ppm or smaller.

As explained above, if the content of the chlorine atoms in the particles for electrorheological fluid is 1 ppm or greater, the electrorheological fluid containing particles in the dispersion medium containing fluorine atoms will be low in base viscosity regardless of the content of the fluorine atoms in the dispersion medium and therefore an excellent ER effect can be exhibited. On the other hand, if the chlorine atoms in the particles are 5,000 ppm or smaller, the dispersion stability of the particles in the electrorheological fluid can be made a high one. Therefore, an electrorheological fluid containing particles with a content of the chlorine atoms of 1 ppm or greater and 5,000 ppm or smaller in range is extremely high in practicality.

The content of the chlorine atoms in the particles for electrorheological fluid is more preferably 10 ppm or greater, 100 ppm or greater, or 500 ppm or greater and 4,500 ppm or smaller, 4,000 ppm or smaller, or 3,500 ppm or smaller.

The source of the chlorine atoms contained in the particles for electrorheological fluid in the present invention may be the residue of the chlorosulfuric acid or other material used in the process of production of a sulfonic acid group-containing polymer suitably used in the present invention. Such a chlorine source can be removed or reduced by neutralization. However, the above chlorine source may be taken into the obtained particles and be slowly released over time, so in the neutralization, it is preferable to carry out the neutralization while carefully watching the stability of the pH.

If the chlorine atoms contained in the particles for electrorheological fluid are below the lower limit of the above preferable range, a chlorine source can be added to the particles to adjust the content of chlorine atoms. As the above chlorine source, for example, chlorides of alkali metals or alkali earth metals (for example sodium chloride and calcium chloride), and hydrochlorides may be mentioned.

The average particle diameter of the particles for electrorheological fluid is preferably in the range of 0.1 to 100 μm, particularly preferably the range of 1 to 20 μm or 5 to 20 μm.

In particular, if the particles for electrorheological fluid contain 1 ppm or greater of chlorine atoms, when the average particle diameter of the particles is 5 μm or greater, the correlation between the content of the chlorine atoms in the particles and the base viscosity when using particles for the electrorheological fluid becomes greater, so the ER effect can be more effectively enjoyed, so this is preferable.

Particles of large size and of small size in the above range may be suitably mixed for use. Specifically, the arithmetic standard deviation of the particle diameter distribution of the particles is preferably 0.1 to 20 μm in range, particularly preferably 1 μm to 10 μm in range.

The average particle diameter of the particles is made the particle diameter at a cumulative 50% (D50) in the particle diameter distribution found by the laser diffraction/scattering method. The shape of the particles may be spherical or irregular.

Electrorheological Fluid

The electrorheological fluid of the present invention is comprised of the above such dispersion medium containing the above such particles for electrorheological fluid.

The ratio of the particles for electrorheological fluid and the dispersion medium in the electrorheological fluid of the present invention is, in terms of the ratio of the particles for electrorheological fluid to the total of the particles for electrorheological fluid and the dispersion medium, preferably 10 to 50 vol %, more preferably 20 to 50 vol %, still more preferably 25 to 50 vol %, particularly preferably 25 to 45 vol %. If the ratio of the particles for electrorheological fluid is excessively low, at the time of application of voltage, there are fewer bridges formed between particles, so the degree of improvement of viscosity with respect to the applied voltage sometimes becomes smaller. On the other hand, if the ratio of the particles for electrorheological fluid is excessively high, the viscosity in the state with no voltage applied (base viscosity) tends to become higher. Therefore, a suitable ratio of particles may be set considering the values of the electrorheological effect and base viscosity in accordance with the purpose of use.

The electrorheological fluid of the present invention may be comprised of only the above particles and the dispersion medium or may as required have an antioxidant, corrosion inhibitor, dispersant, or other additive added to it. Water may be added to an extent not obstructing the electrorheological effect. The amount of the water added with respect to the particles is preferably made 5 wt % or smaller, more preferably 0.5 wt % to 5 wt %, still more preferably 1 wt % to 3 wt %.

The electrorheological fluid of the present invention can exhibit an electrorheological effect (ER effect) X expressed by the following formula (1) of 110 or greater:

$$X=S_1/S_0 \quad (1)$$

(where in formula (1), $S_1$ is the shear stress when applying a 3.0 kV/mm electric field, while $S_0$ is the shear stress when not applying an electric field)

The larger the X value, the higher the ER effect exhibited. The X value in the electrorheological fluid of the present invention may further be 120 or greater, 130 or greater, 140 or greater, 150 or greater, 160 or greater, or 170 or greater.

The larger the X value, the better from the viewpoint of expression of the ER effect, but if considering the balance between the ER effect required in relation to the application and the manufacturing cost, it may be 250 or smaller, 225 or smaller, 200 or smaller, 190 or smaller, or 180 or smaller.

Electric Device

The electric device of the present invention is preferably an electric device comprised of an electrorheological fluid which is comprised of a dispersion medium in which particles for electrorheological fluid are contained and which is filled between a pair of electrodes, in which electric device, in a region of at least part of at least one surface of the surfaces of the pair of electrodes facing each other, an arithmetic mean roughness (Ra) is 0.5 μm or greater and less than 300 μm and a mean length (RSm) of roughness curve elements is 10 nm or greater and less than 100 μm.

The electric device of the present invention is configured arranging an electrorheological fluid containing particles for electrorheological fluid in a dispersion medium between a pair of electrodes. Voltage is applied across the electrodes so as to control at least one of the force required for changing the relative position of the electrodes and the fluidity of the electrorheological fluid flowing through the electrode gap. The particles in the electrorheological fluid become polarized by application of voltage. The polarized particles form bridges in the electric field direction between the electrodes. The force required for cutting the bridges increases the viscosity. The change in viscosity of the electrorheological fluid is proportional to the electric field intensity applied, so making the electrode gap as narrow as possible enables a large shear stress to be exhibited by a low voltage.

An example of the action of the electric device of the present invention will be explained with reference to the drawings.

Figure 2:
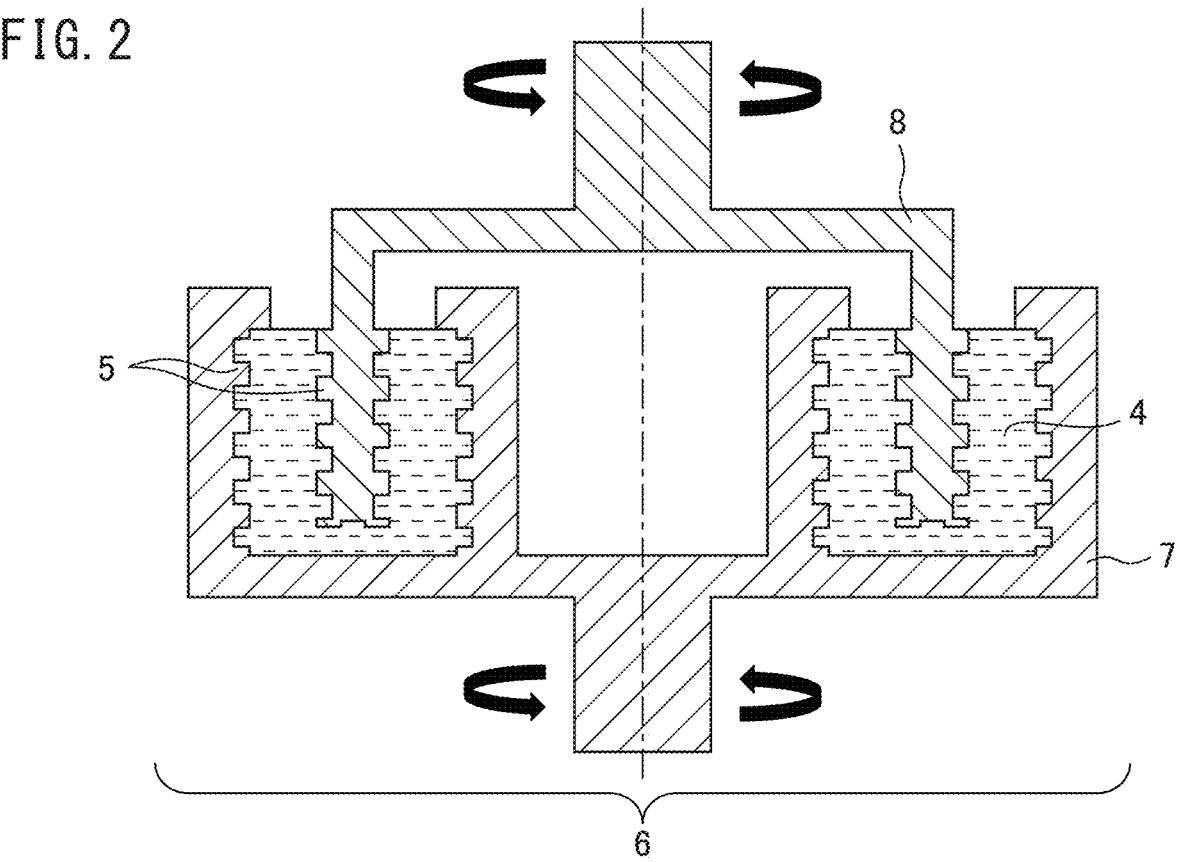
FIG. 2 is a conceptual view of another example of an embodiment of an electric device of the present invention as constituted by a clutch using an electrorheological fluid.
Figure 3:
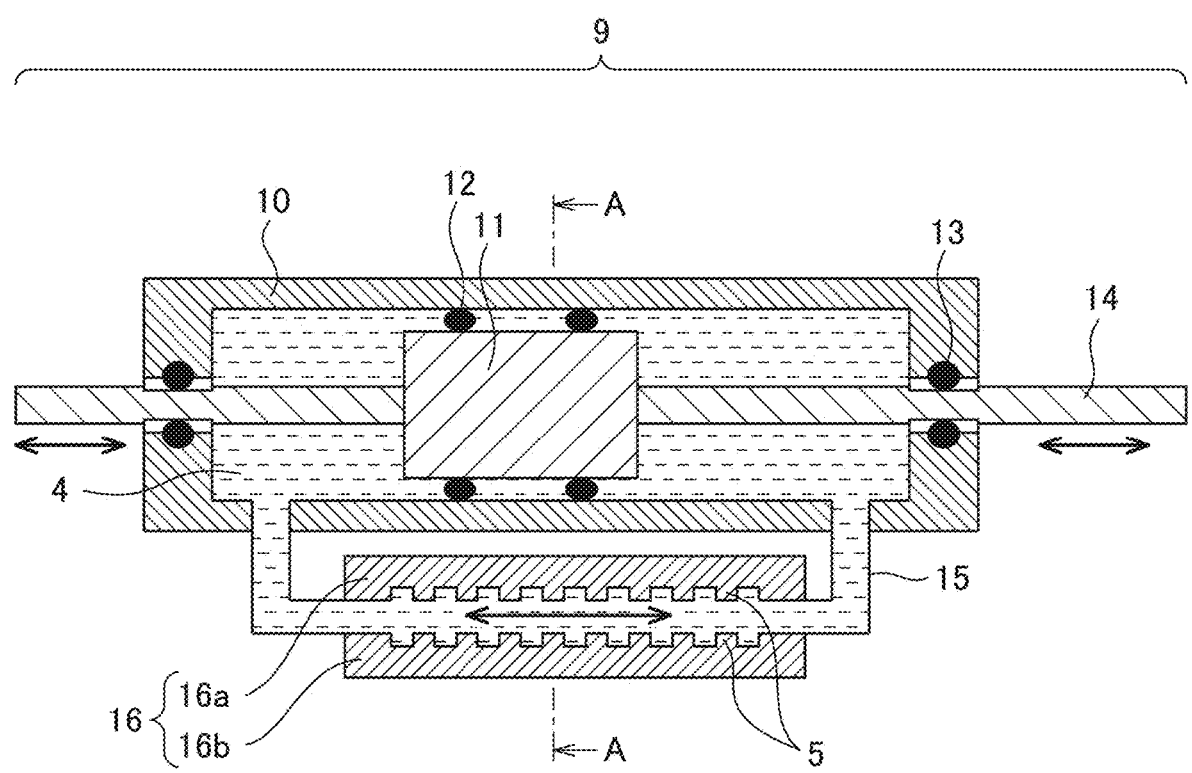
FIG. 3 is a conceptual view of another example of an embodiment of an electric device of the present invention as constituted by a damper using an electrorheological fluid.

FIG. 1 shows a conceptual view of the brake using an electrorheological fluid,

FIG. 2 shows a conceptual view of a clutch using the electrorheological fluid, and FIG. 3 shows a conceptual view of a damper using the electrorheological fluid.

The brake 1 of FIG. 1 is comprised of a fixed cylinder 2, a rotary cylinder 3 which is a moving part, and an electrorheological fluid 4 filled between the same.

The fixed cylinder 2 and the rotary cylinder 3 face each other. The gap between the two is filled by the electrorheological fluid 4. The inside surfaces of the fixed cylinder 2 and the rotary cylinder 3 contacting the electrorheological fluid 4 are respectively provided with electrodes. These electrodes may be arranged formed at only parts of the inside surfaces of the fixed cylinder 2 and the rotary cylinder 3 or may be formed over the entire surfaces of these inside surfaces. One of the electrode arranged at the inside surface of the fixed cylinder 2 and the electrode arranged at the inside surface of the rotary cylinder 3 is supplied with a high voltage while the other is supplied with a low voltage (in general, the ground). The two form a pair of electrodes. Regarding the electrodes, when the fixed cylinder 2 or the rotary cylinder 3 itself is comprised of a conductive metal, that cylinder itself may also serve as an electrode. When the cylinder is comprised of a nonconductive resin, the electrode may also be comprised from another conductive material separated from that cylinder. FIG. 1 shows a brake 1 having a fixed cylinder 2 and a rotary cylinder 3 made integral with each other and having a pair of electrodes 5 roughened on the surfaces.

When not applying voltage across the electrodes in the brake of FIG. 1, the viscosity of the electrorheological fluid 4 present between the electrodes is low in state. Therefore, the rotary cylinder 3 which is the moving part easily rotates with a small force and the brake becomes disengaged. If applying voltage across the electrodes, an electric field is applied to the electrorheological fluid 4 and the viscosity is increased. Due to this, the torque for making the rotary cylinder 3 rotate increases and the brake becomes engaged. By controlling the strength of the voltage applied across the electrodes, it becomes possible to make the brake torque continuously change to any values.

Such a variable torque brake, for example, can be suitably applied as a brake of a drive part of a vehicle; a brake of a door, trunk, or other rotary moving part; a brake of an apparatus having a rotary drive part; a brake in a prosthetic arm, prosthetic leg, an assist robot; and a brake mounted in an apparatus creating a virtual reality.

Next, a conceptual view of a clutch of FIG. 2 will be explained. FIG. 2 is a cross-sectional view of a cylindrical type clutch.

The clutch 6 of FIG. 2 is comprised of an input rotary cylinder 7 to which an external force is input, an output rotary cylinder 8 outputting a rotational force in accordance with the movement of the input rotary cylinder 7, and an electrorheological fluid 4 filled between them. The input rotary cylinder 7 and the output rotary cylinder 8 face each other. Electrodes are arranged at the inside surfaces contacting the electrorheological fluid 4. The configuration of these electrodes is similar to the case of the above-mentioned brake. FIG. 2 shows a clutch 2 comprised of the input rotary cylinder 7 and the output rotary cylinder 8 made integral and having a pair of electrodes 5 roughed on the surfaces. However, the shape and extent of surface roughening of the electrodes 5 in FIG. 2 are changed or emphasized for convenience in creating the drawings. The illustrated rectangular relief shapes do not show the preferable surface shapes of the electrodes in the present embodiment.

When not applying voltage across the electrodes in the clutch of FIG. 2, the viscosity of the electrorheological fluid 4 present between the electrodes is low in state. Therefore, rotation of the input rotary cylinder 7 is not transmitted to the output rotary cylinder 8 resulting in a so-called disengaged clutch state. If voltage is applied across the electrodes, an electric field is applied to the electrorheological fluid 4 and the viscosity becomes greater. Due to this, rotation of the input rotary cylinder 7 is transmitted to the output rotary cylinder 8 resulting in a so-called engaged clutch state. By controlling the strength of the voltage applied across the electrodes, it becomes possible to make the ratio of transmission of the clutch change continuously by any value.

Such a variable transmission ratio clutch, for example, can be suitably applied as a clutch in an engine of a vehicle or a fan drive part; a clutch of industrial equipment; a clutch in a prosthetic arm, prosthetic leg, or assist robot; and a clutch mounted in an apparatus creating a virtual reality.

The damper 9 of FIG. 3 is configured of a tubular type cylinder 10 and a parallel plate type electrorheological fluid valve 16 are connected by piping 15. The tubular type cylinder 10 holds a piston shaft 14 moving to the left and right. The parallel plate type electrorheological fluid valve 16 comprises of parallel plates 16a and 16b arranged at the outside of the cylinder 10. The piston shaft 14 has a piston ring 12 which is connected to the piston shaft 14. The cylinder 10, piping 15, and parallel plate valve 16 are completely filled with the electrorheological fluid 4. The parallel plates 16a and 16b at the valve 16 are formed with electrodes 5 obtained by roughening the facing surfaces of these plates. An electric field can be applied to the electrorheological fluid 4. Seals 13 are set between the piston shaft 14 and the inside surface of the cylinder and between the piston shaft 14 and the bearing part of the cylinder 10 so as to prevent leakage of the electrorheological fluid 4.

Figure 4:
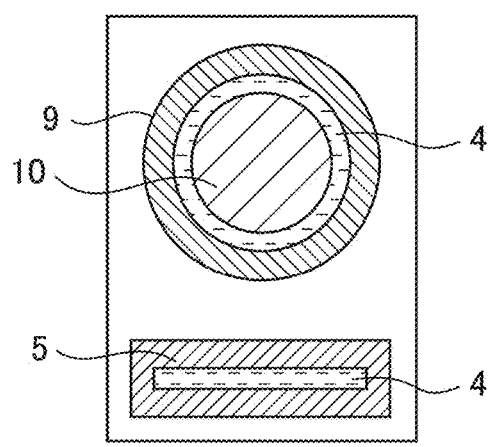
FIG. 4 is a cross-sectional view along the line A-A of the damper shown in FIG. 3.

FIG. 4 is a cross-sectional view along A-A of the damper 9 of FIG. 3.

In the damper 9 of FIG. 3 and FIG. 4, when not applying an electric field to the electrorheological fluid 4, the piston shaft 14 moves lightly to the left and right, but if applying an electric field, the viscosity of the electrorheological fluid 4 in the cylinder is improved and the piping becomes difficult to move through. The ease of movement of the piston shaft 14 can be controlled by the intensity of the electric field applied.

The shape and extent of the surface roughening of the electrode 5 in FIG. 1 to FIG. 3 are both changed or emphasized for convenience in drawing the figures. The illustrated rectangular relief shapes do not show the preferred surface shapes of the electrodes in the present embodiment.

The above electric device is generally called a "shear flow type". The present invention may be applied not only to the shear flow type, but also the compression flow type used as valves or dampers and the compression shear flow type (squeeze flow) used as dampers. The present invention encompasses all of these.

As explained above, the change in viscosity of the electrorheological fluid is substantially proportional to the square of the electric field intensity applied. Therefore, making the electrode gap as narrow as possible enables a large shear stress to be exhibited by a low voltage. In the electric device of the present invention, the electrode gap is preferably 0.5 mm or smaller, more preferably 0.3 mm or smaller. For the following reason, a gap of 0.01 mm or greater is preferable. That is:

(1) As the electrode gap is narrowed, the shear rate applied to the electrorheological fluid when making the electrode move becomes larger. Even in the state not applying voltage, the resistance of movement of the electrodes becomes too large, (2) In the electrorheological fluid, in general, particles of a particle diameter of several μm to tens of μm are use. If the electrode gap is too narrow, even if temporarily, a fluid containing particles combining to form secondary particles can no longer be used, and (3) If the device becomes larger, in terms of mechanical precision, it becomes difficult to uniformly hold an electrode gap of less than 0.01 mm.

From the above points, if making the electrode gap less than 0.01 mm, there is a possibility of product defects occurring more easily. The electrode gap is more preferably 0.05 mm or greater, still more preferably 0.1 mm or greater.

The arithmetic mean roughness (Ra) of the electrode surfaces at the electric device of the present invention is preferably 0.5 μm or greater from the viewpoint of making stress acting between the electrodes and the electrorheological fluid at the time of application of an electric field sufficiently high and suppression of the stick-slip phenomenon. This Ra is more preferably 0.7 μm or greater, more preferably 0.9 μm or greater, particularly preferably 1.1 μm or greater. On the other hand, from the viewpoint of holding the stress acting between the electrodes and the electrorheological fluid at the time of no application of an electric field low, of making sufficient use of the merit that the base viscosity of the later explained electrorheological fluid is low, and of enabling a compact device design, the above Ra is preferably 300 μm or smaller. This Ra may be 200 μm or smaller, 100 μm or smaller, 50 μm or smaller, or 10 μm or smaller.

The electric device of the present invention can extremely effectively suppress the stick-slip phenomenon if the mean length (RSm) of the roughness curve elements at the relief shapes of the electrode surface is within a certain range. From such a viewpoint, RSm is preferably 10 nm or greater. This RSm may be 50 nm or greater, 100 nm or greater, 500 nm or greater, 1 μm or greater, or 5 μm or greater. On the other hand, the above RSm is preferably less than 100 μm. This RSm may be 90 μm or smaller, 80 μm or smaller, 70 μm or smaller, 60 μm or smaller, or 50 μm or smaller.

In the present invention, the arithmetic mean roughness (Ra) and the mean length (RSm) of the roughness curve elements of the electrode surface can, for example, be calculated based on JIS B 0601-2001 from the profile curve obtained for the electrodes by a commercially available surface shape measurement device or the image captured by a laser microscope.

The measured length is preferably made 400 μm or greater. Typically, it is 550 μm.

If forming relief shapes on the surface of the electrodes, the electrorheological effect is improved. As the method of formation of the relief shapes in the prior art, for example, sandblasting, etching, hairline processing, matte finishing, pattern etching, and other methods are known. However, the inventors discovered that among these, sandblasting improves the electrorheological effect more than other relief processing and is remarkably effective in suppressing pulsation.

Sandblasting is a method of blasting a surface to be worked by particles of a blasting medium by compressed air so as to form relief shapes on the surface. As diameter of the blasted particles, 30 μm to 300 μm is preferable. As the material of the blasted medium, for example, beads comprised of zirconia, stainless steel, alumina, carborundum, or boron carbide are used. The material and the particle diameter of the blasted medium can be suitably selected in accordance with the shape and size of the relief shapes required.

Figure 11:
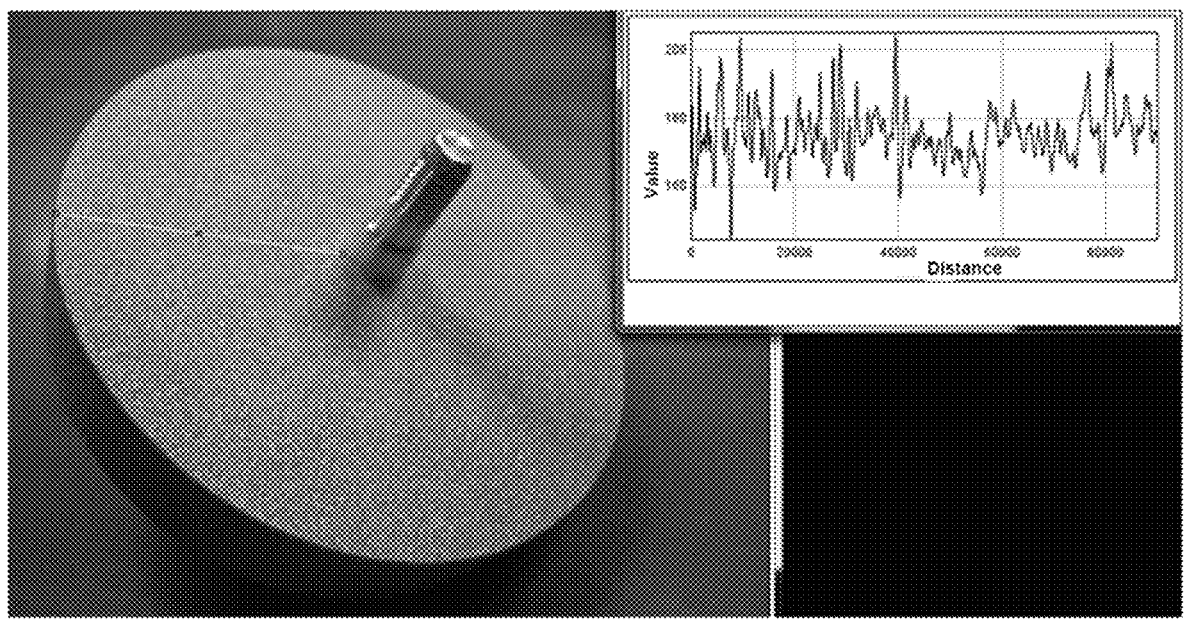
FIG. 11 shows a photo and a profile of the relief shapes of a rotor of a disk type brake sandblasted in Reference Example f-1.
Figure 12:
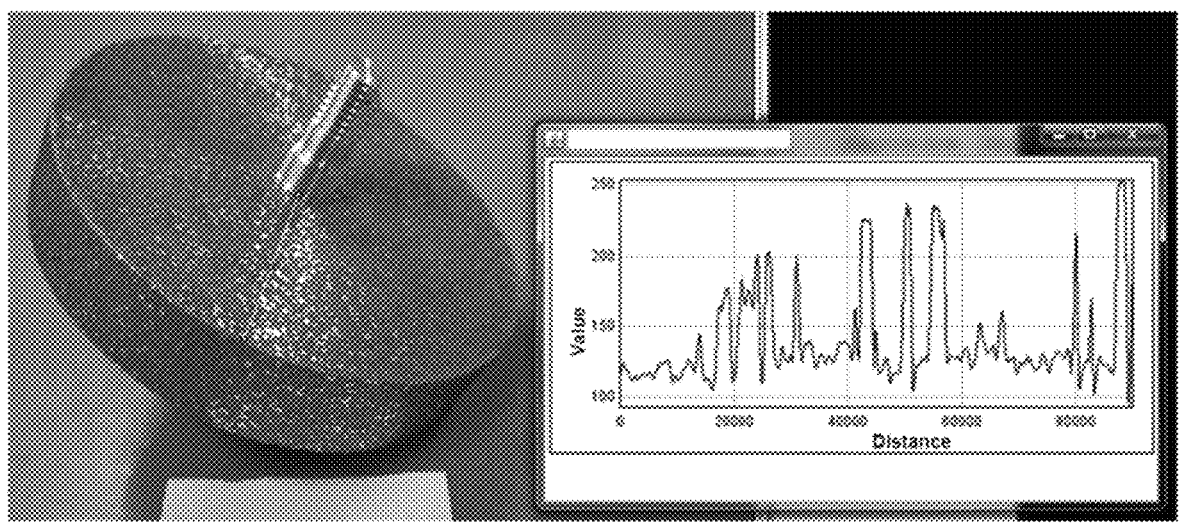
FIG. 12 shows a photo and a profile of the relief shapes of a rotor of a disk type brake etched in Reference Example f-2.
Figure 13:
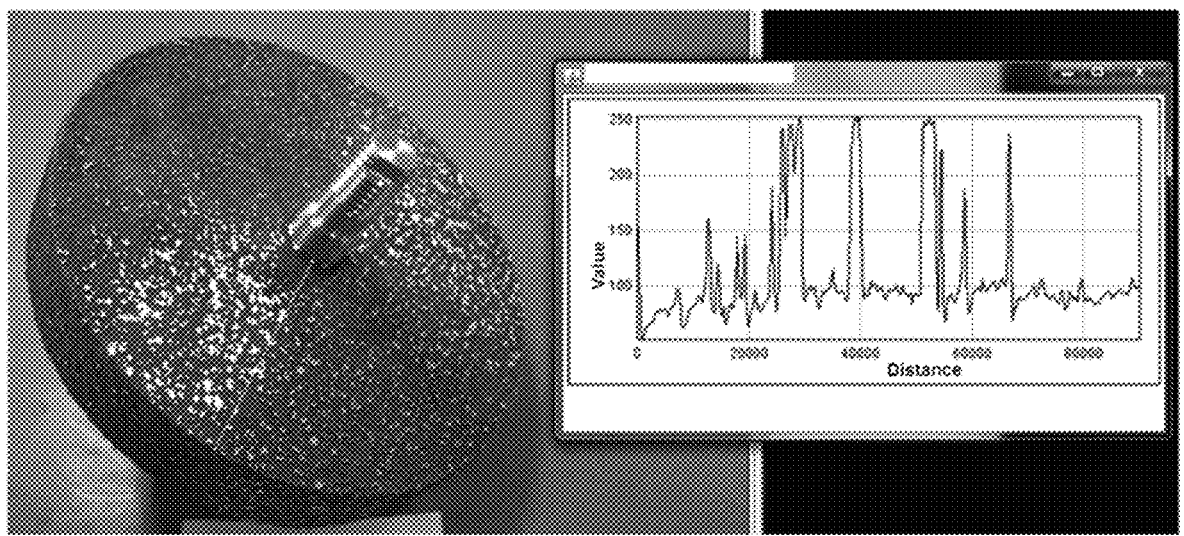
FIG. 13 shows a photo and a profile of the relief shapes of a rotor of a disk type brake etched in Reference Example f-3.

FIG. 11 to FIG. 13 show photos of the electrode surfaces formed with relief shapes in the later explained Reference Examples f-1 to f-3 and profiles of the relief shapes for the photos drawn using the surface plot function of the image analyzing software ImageJ (public domain, http://rsb.info-.nih.gov/ij/). The plots of the profiles are drawn from the end parts of the rotors of the brakes to the root parts of the shafts. If comparing these profiles, it becomes clear that the shapes of the relief shapes remarkably differ depending on the method of processing. In sandblasting (Reference Example f-1, FIG. 11), the pitch between relief shapes is narrow and the shapes have pointed tips. As opposed to this, in etching (Reference Examples f-2 and f-3, FIG. 12 and FIG. 13), the pitch between relief shapes is broad and the tips are rounded or flat.

In general, if relief shapes are formed on the electrode surfaces of an electric device using an electrorheological fluid, it is believed that the frictional resistance between the relief shapes of the electrodes and the electrorheological fluid becomes higher and the reduction of the electrorheological effect due to slippage is suppressed. The reason why sandblasting is particularly effective compared with other processing is believed to be the shapes of the tips of the relief.

That is, the shape of the relief shapes of the electrode surfaces is preferably a shape with projecting parts with pointed tips. By making the relief shapes have pointed tips, concentration of the electric field easily occurs. Due to this, it is believed that the electrorheological effect is increased.

Even if the tips of the relief shapes are flat, it is believed that some improvement is seen in the electrorheological effect due to the effect of slip suppression. However, in flat shaped relief shapes, concentration of the electric field seldom occurs, so it is believed that that total electrorheological effect does not become that large.

Preferably, the relief pitch and the height of the relief of the electrode surfaces are respectively larger than the particle diameter of the solid particles dispersed in the electrorheological fluid used. However, if the relief shapes are too large, flat shapes result, so concentration of the electric field seldom occurs.

The relief shapes of the electrodes in the electric device of the present invention are preferably present on both surfaces of the pair of electrodes. As the ratio of area of the surface regions of the electrodes on which the relief shapes are formed when the total of the regions sliding in contact with the electrorheological fluid after making the electric device is made 100%, 70% or greater is preferable, 80% or greater is more preferable, 90% or greater is still more preferable, and 95% or greater is particularly preferable. The ratio may also be 100%.

The electrorheological fluid in the electric device of the present invention is an electrorheological fluid comprised of a dispersion medium in which particles for electrorheological fluid are contained and is preferably the electrorheological fluid of the present invention explained above.

The electric device of the present invention can, for example, be applied to all applications of a brake, clutch, damper, vibration/shock absorption, hydraulic/pneumatic control, position/speed control, and gripping/fastening. As specific applications of the electric device of the present invention, for example, a device for an automobile, a virtual reality device, prosthetic arm or prosthetic leg, or assist robot may be mentioned. "Virtual reality" is the art of making a virtual space created by a computer feel like reality. The electric device of the present invention is preferably used for a system creating a virtual reality for a person by giving a sense of force in response to image information and audio information given by a computer. As examples of such a virtual reality haptic system, for example, a video game, rehabilitation equipment, training apparatus, and rehabilitation robot may be mentioned.

The electric device of the present invention can generate a large shear stress even when the voltage applied across the electrodes is low, so is suitable for equipment used in the home. The reaction time is fast and the displacement of the shear stress can be finely and smoothly controlled, so a delicate sense of operation such as corresponding to the actual movement of a muscle can be generated. As rehabilitation equipment, for example, a system where a shear stress corresponding to the image on the display is generated when a patient operates a handle connected to an electric device while viewing a display may be mentioned. The electric device of the present invention can give a more realistic sense of force to a patient. This electric device is low in operating voltage, so application to a haptic device for rehabilitation equipment used in the home is most suitable.

Haptic Device

Figure 5:
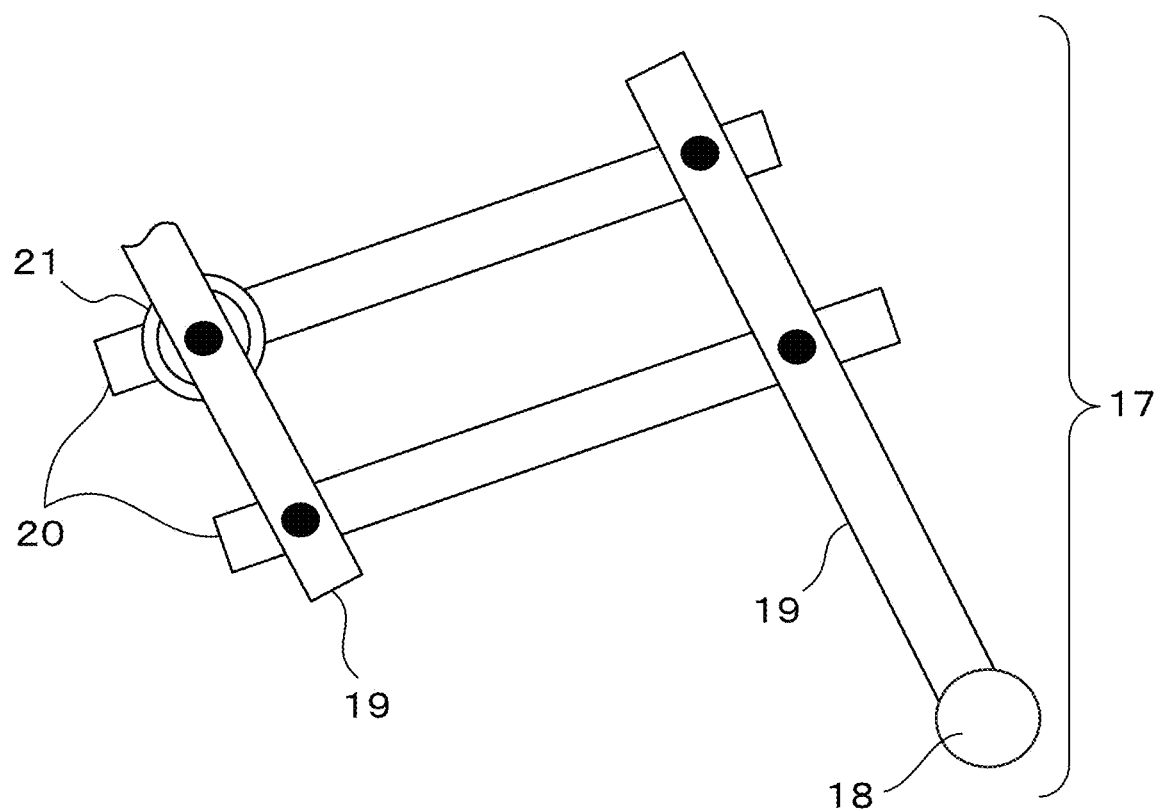
FIG. 5 is a conceptual view of a grip and arm of a virtual reality haptic device using the electric device of the present invention.
Figure 6:
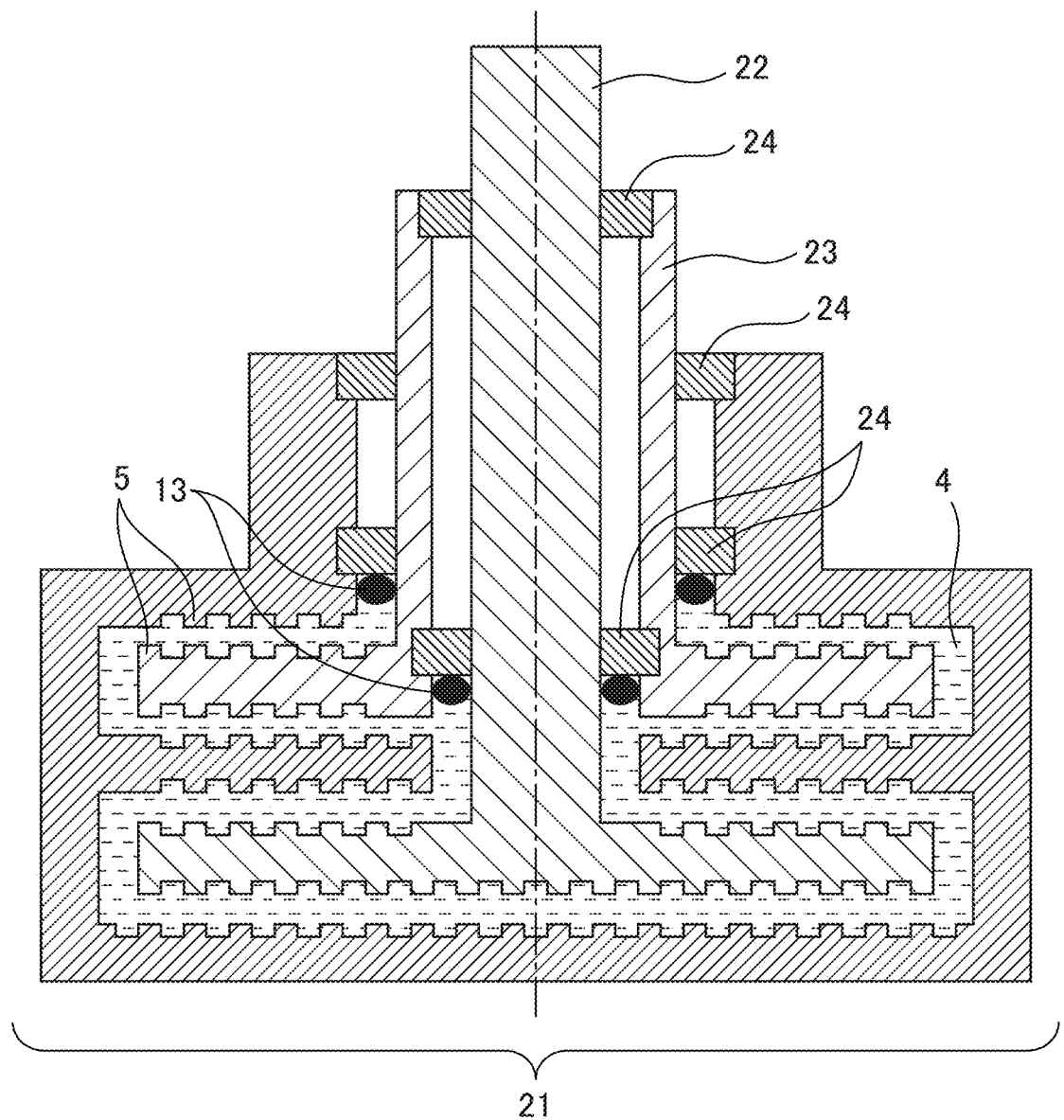
FIG. 6 is a conceptual view of a coaxial twin brake using an electric device of the present invention arranged in an arm part of the virtual reality haptic device shown in FIG. 5.
Figure 7:
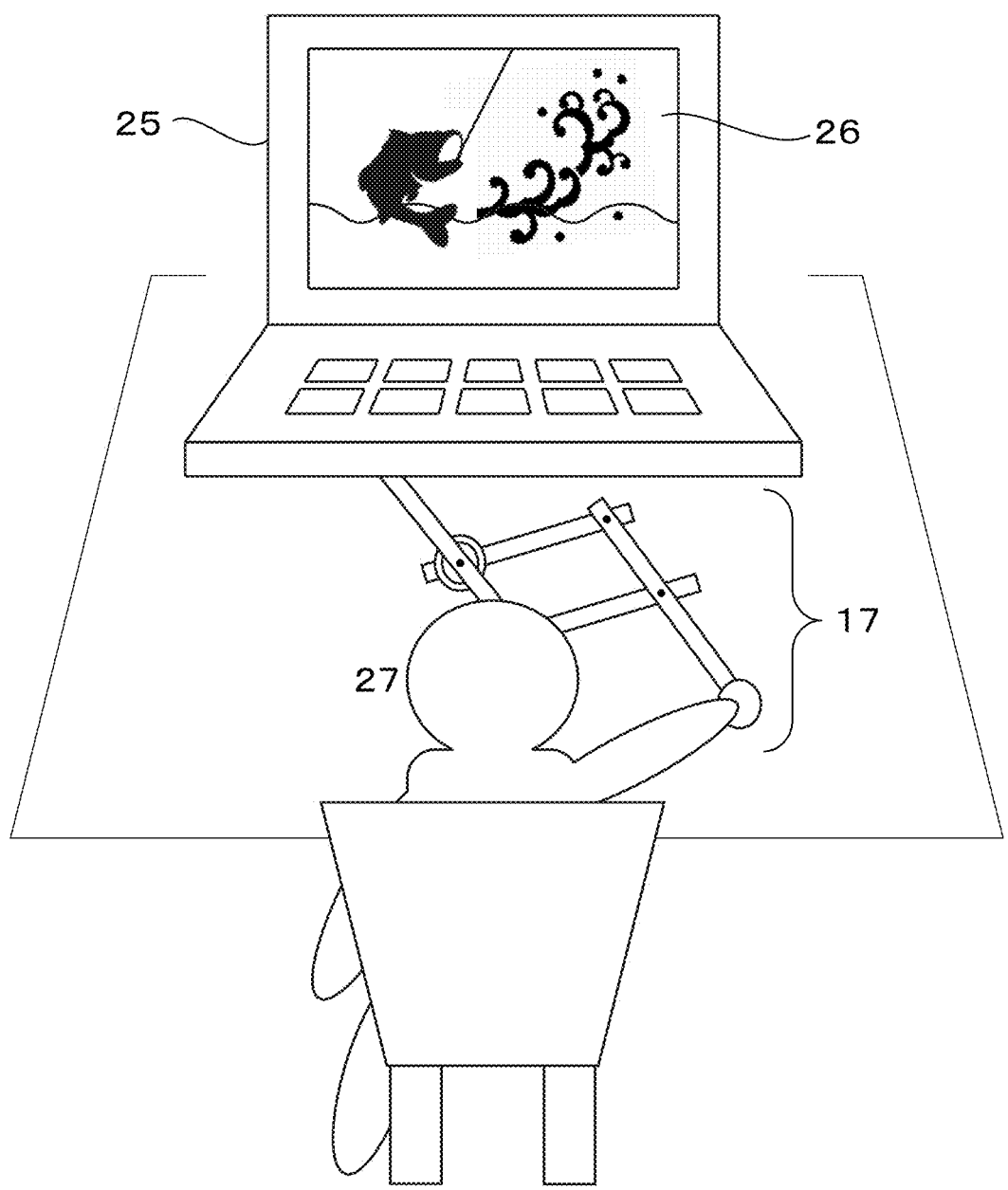
FIG. 7 is a conceptual view of one example of a virtual reality haptic device using the electric device of the present invention as constituted by a rehabilitation apparatus.

FIGS. 5 to 7 show one example of an application of the electric device of the present invention of a virtual reality haptic device and rehabilitation equipment using the same.

FIG. 5 is a conceptual view of an arm 17 of a virtual reality haptic device using the electric device of the present invention.

That arm 17 is comprised of two X-axis arms 19 and two Y-axis arms 20 forming a parallel link. One end of this parallel link is coupled with a coaxial twin brake or the shaft of a clutch. These brake or clutch restrict movement along the X-axis and Y-axis to thereby restrict movement of the grip 18 and generate a sense of force. Change of the position of the grip 18 is controlled by the PC through the brake or the clutch. The operator holding the grip 18 feels as if actual force is being exerted.

FIG. 6 is a conceptual view of one example of the electric device of the present invention arranged at the arm part of a virtual reality haptic device of FIG. 5 as constituted by a coaxial twin brake 21. That coaxial twin brake 21 is structured as a fixed cylinder in which two disks forming electrodes 5 are set. The gaps between the disks and the fixed cylinder are filled with the electrorheological fluid 4. At the centers of the two disks, respectively, an inside shaft 22 and that shaft 23 are connected. The inside shaft 22 receives an electrical signal for X-axis direction control shown from a PC. The viscosity of the electrorheological fluid 4 changes in accordance with the strength of the voltage of the received signal thereby determining the mobility in the X-axis direction. Using a similar setup, the mobility of the outside shaft 23 as well in the Y-axis direction is determined. Due to these, it is possible to control the mobility in any direction by an electric signal. Between the inside shaft and outside shaft and between the outside shaft and fixed cylinder, respectively, insulating bearings 24 are provided. Between the fixed cylinder and the outside shaft 23 and between the outside shaft 23 and inside shaft 22, respectively, seals 13 are provided for preventing leakage of the electrorheological fluid 4.

FIG. 7 is a schematic view of rehabilitation equipment using a sense of force creating a virtual reality provided with the arm part of FIG. 5. On the monitor of the PC 25, one example of a rehabilitation game, that is, a bass fishing game 26, is shown. A patient 27 holds the grip 18 and moves it up, down, left, and right to move the fishing line and the hook at the front tip in position. If hooking the bass right on the screen, the patient moves the grip 18 so as to reel in the hooked bass. This being so, the direction of escape of the bass is given as voltage to the coaxial twin brake 21. Movement of the grip 18 in a certain direction becomes difficult while movement in another direction becomes easy. Due to these mechanisms, it becomes possible to give to a patient 27 holding the grip 18 a force like that given to a fishing rod when a bass is actually hooked.

EXAMPLES

Analysis of Electrorheological Fluid

The weight ratios of the sulfonic acid groups in the particles used in the examples, comparative examples, and reference examples, unless otherwise indicated, were found from the respective contents of sulfur atoms and sodium atoms found by elemental analysis.

The amounts of chlorine atoms in the particles were quantified by decomposing the particles by wet decomposition by aqua regia and measuring them by ICP emission measurement.

The weight ratios of the fluorine atoms contained in the dispersion medium were calculated by the structures of the Daifloil® and Demnum® used as the fluorine sources and their amounts of addition.

The fluorine-based oils and silicone oils used in the following examples, comparative examples, and reference example were as follows:

Fluorine-Based Oils

Daifloil #1: made by Daikin Industries, Ltd., structural formula $(C_2F_3Cl)_n$, average molecular weight: 500, viscosity: 5 to 15 cSt (25° C.)

Daifloil #3: made by Daikin Industries, Ltd., structural formula $(C_2F_3Cl)_n$, average molecular weight: 700, viscosity: 20 to 50 cSt (25° C.)

Daifloil #1+Demnum: mixture of 100 parts by weight of above Daifloil #1 into which Demnum S-20 (made by Daikin Industries, Ltd., perfluoropolyoxypropylene oil) was added in an amount of 42 parts by weight Silicone Oils KF96-5cs: made by Shin-Etsu Chemical Co., Ltd., polydimethyl siloxane, dynamic viscosity: 5.0 mm²/s (25° C.)

KF96-20cs: made by Shin-Etsu Chemical Co., Ltd., polydimethyl siloxane, dynamic viscosity: 20 mm²/s (25° C.)

Effect of Content of Fluorine Atoms in Dispersion Medium

Example A-1

A 500 ml four-necked flask equipped with a stirrer, reflux condenser, and thermometer was charged with 207 g of 30 wt % fuming sulfuric acid. While stirring, this was cooled using an ice bath to 0° C. Next, 15 g of styrene-divinylbenzene copolymer beads (made by ALDRICH, ratio of divinylbenzene in copolymer=5 wt %, particle diameter 8.0 to 9.0 μm) was added. The mixture was stirred under nitrogen flow to obtain a homogeneous dispersion. Next, a dropping funnel was charged with 32 g of chlorosulfuric acid which was then added dropwise over 5 minutes. The ice bath was detached, the mixture was stirred at 25° C. for 1 hour, then was raised in temperature to 80° C. where it was stirred for 8 hours to sulfonate the particles. After the end of the reaction, the reaction mixture in the flask was poured into the ice a little at a time. The mixture was allowed to stand, then the supernatant was removed to obtain sulfonic acid group-containing polymer particles (weight ratio of sulfonic acid groups to sulfonic acid group-containing polymer of 55.5 wt %, average particle diameter of 11 μm, water content of 2 wt %).

The above sulfonic acid group-containing polymer particles were crushed on a sample table made of Ge, then used for IR measurement. The obtained spectrum was analyzed by a database software whereby it was confirmed that above sulfonic acid group-containing polymer was a sulfonated product of a styrene-divinylbenzene copolymer having a sulfonated aromatic structure.

The obtained sulfonic acid group-containing polymer particles were charged into about 1 liter of distilled water. This was allowed to stand, the supernatant was removed, then the remainder was successively washed with water and acetone, and then filtered to take out only the particles.

A beaker equipped with a pH meter was charged with the obtained particles. A 10 wt % sodium hydroxide aqueous solution was added to obtain a dispersion. While stirring, this was neutralized to obtain neutralized particles (1). At this time, the stirring was continued for a sufficiently long time until the pH of the dispersion stabilized. It was confirmed that the particles were reliably neutralized.

After that, filtration was used to take out the neutralized particles (1) which were then successively washed with water and acetone. To the washed neutralized particles (1), a sodium chloride aqueous solution was added to obtain a Fluid Composition 1 of which an amount of chlorine atoms adjusted to a weight ratio of dried particles of 800 ppm.

This Fluid Composition 1 was dried at 80° C. for 10 hours in vacuum. The obtained particles were mixed and dispersed to give a volume ratio of 40% in a dispersion medium having composition of Daifloil #3: 65 parts by volume and KF96-5cs: 35 parts by volume to obtain an electrorheological fluid (A-1).

Examples A-2 to A-10 and Comparative Examples a-1 to a-3

Except for making the volume ratios of mixture of the fluorine-based oil (Daifloil #1) and silicone oil (KF96-20cs) in the dispersion medium and the weight ratios of sulfonic acid groups in the sulfonic acid group-containing polymer particles respectively as described in Table 1, the same method as Example A-1 was used to obtain electrorheological fluids (A-2) to (A-10) and comparative fluids (a-1) to (a-3).

The ratio of sulfonic acid groups in the sulfonic acid group-containing polymer particles was adjusted by changing the amounts used of fuming sulfuric acid and chlorosulfuric acid when sulfonating styrene-divinylbenzene copolymer beads and the reaction temperature.

Evaluation of Electrorheological Fluids

The above obtained electrorheological fluids were respectively filled between the pair of electrodes (distance between electrodes of 0.5 mm and electrode area of 1,223 mm²). At a temperature of 25° C. a voltage of 3.0 kV/mm was applied. A digital force gauge FG-5005 made by MotherTool Co., Ltd. was used to measure the shear stress. In a state not applying an external electric field, the shear stress value at 25° C. was measured using a viscometer (made by Toki Sangyo Co., Ltd., Model TV-33 Viscometer Cone-Plate Type) (shear rate=10/sec).

The smaller the shear stress value when not applying an electric field to the electrorheological fluid or the larger the shear stress value when applying an electric field, the better. A fluid in which both are excellent is particularly preferable. Therefore, as a parameter for judging the ER effect of the electrorheological fluid, the ratio $X=S_1/S_0$ between the value $S_1$ of the shear stress when applying an electric field of 3.0 kV/mm and the shear stress value $S_0$ when not applying an electric field was used. With an electrorheological fluid with a small shear stress $S_0$ when not applying an electric field and a large shear stress $S_1$ when applying an electric field of 3.0 kV/mm, the above X value becomes larger. It can be evaluated that a large ER effect is exhibited.

For the above obtained electrorheological fluid, the weight ratio of the sulfonic acid group with respect to the weight of the sulfonic acid group-containing polymer in the particles, the weight ratio of the fluorine atoms in the dispersion medium, the shear stress when not applying an electric field, and the result of the X value are respectively shown in Table 1.

TABLE 1

| | Name of electro-rheological fluid | Dispersion medium | | | | Weight ratio of fluorine atoms (wt %) | Particles | | Results of evaluation | |
| | | Fluorine-based oil | | Silicone oil | | | Weight ratio of sulfonic acid groups in polymer (wt %) | Content of chlorine atoms in polymer (ppm) | | |
| | | Type | Amount used (vol. ratio) | Type | Amount used (vol. ratio) | | | | ER effect (X value) | Base viscosity (mPa·s) |
|---|---|---|---|---|---|---|---|---|---|---|
| Example A-1 | A-1 | Daifloil #1 | 65 | KF96-20cs | 35 | 38.4 | 55.5 | 800 | 153.2 | 1396 |
| Example A-2 | A-2 | Daifloil #1 | 70 | KF96-20cs | 30 | 40.2 | 55.5 | 800 | 177.0 | 1086 |
| Example A-3 | A-3 | Daifloil #1 | 65 | KF96-20cs | 35 | 38.4 | 52.3 | 800 | 143.3 | 1397 |
| Example A-4 | A-4 | Daifloil #1 | 55 | KF96-20cs | 45 | 34.6 | 55.5 | 800 | 118.5 | 1852 |
| Example A-5 | A-5 | Daifloil #1 | 60 | KF96-20cs | 40 | 36.5 | 55.5 | 800 | 139.4 | 1529 |
| Example A-6 | A-6 | Daifloil #1 | 75 | KF96-20cs | 25 | 41.8 | 55.5 | 800 | 117.7 | 1803 |
| Example A-7 | A-7 | Daifloil #1 | 80 | KF96-20cs | 20 | 43.4 | 55.5 | 800 | 112.2 | 1785 |
| Example A-8 | A-8 | Daifloil #1 | 65 | KF96-20cs | 35 | 38.4 | 48.0 | 800 | 120.0 | 1896 |
| Example A-9 | A-9 | Daifloil #1 | 65 | KF96-20cs | 35 | 38.4 | 43.0 | 800 | 119.0 | 1920 |
| Example A-10 | A-10 | Daifloil #1 | 65 | KF96-20cs | 35 | 38.4 | 68.0 | 800 | 119.0 | 1930 |
| Comp. Ex. a-1 | a-1 | — | 0 | KF96-20cs | 100 | 0 | 55.5 | 800 | Not measurable | Not measurable |
| Comp. Ex. a-2 | a-2 | Daifloil #1 | 65 | KF96-20cs | 35 | 38.4 | 28.0 | 800 | 31.0 | 85.0 |
| Comp. Ex. a-3 | a-3 | Daifloil #1 | 65 | KF96-20cs | 35 | 38.4 | 71.0 | 800 | 30.0 | 85.0 |

The "not measurable" in the column of the results of evaluation of Comparative Example a-1 means that under the measured conditions, the dispersion of the electrorheological fluid was poor and reproducible measurement was not possible. The viscosity of the dispersion medium prepared in Comparative Example a-1 was 20 mPa·s.

As will be understood from Table 1,
a fluid comprised of a dispersion medium containing fluorine atoms in which
particles for electrorheological fluid which is a sulfonic acid group-containing polymer with a content of sulfonic acid groups of 30 wt % or greater and 70 wt % or smaller are contained exhibits a large ER effect.

Effects of Content of Sulfonic Acid Groups and Content of Chlorine Atoms in Particles

Examples B-1 to B-9 and Comparative Examples b-1 to b-4

Except for making the type and mixed volume ratio of the fluorine-based oil and silicone oil in the dispersion medium, the weight ratio of the sulfonic acid groups in the sulfonic acid group-containing polymer particles, and the content of the chlorine atoms in the particles those described in Table 2, the same method was used as in Example A-1 to obtain and evaluate each of the electrorheological fluids (B-1) to (B-9) and comparative fluids (b-1) to (b-4).

The ratio of the sulfonic acid groups in the sulfonic acid group-containing polymer particles was adjusted by changing the amounts of use of fuming sulfuric acid and chlorosulfuric acid and the reaction temperature when sulfonating the styrene-divinylbenzene copolymer beads.

The content of the chlorine atoms in the particles was adjusted by changing the concentration of the sodium chloride solution added to the neutralized particles (1) after washing.

In the above, the amount of sulfone groups in the particles was quantified by wet decomposition of particles by aqua regia and ICP emission measurement.

The results of evaluation are shown in Table 2.

TABLE 2

| | Name of electro-rheological fluid | Dispersion medium | | | | Weight ratio of fluorine atoms (wt %) | Particles | | Results of evaluation | |
| | | Fluorine-based oil | | Silicone oil | | | Weight ratio of sulfonic acid groups in polymer (wt %) | Content of chlorine atoms in polymer (ppm) | | |
| | | Type | Amount used (vol. ratio) | Type | Amount used (vol. ratio) | | | | ER effect (X value) | Base viscosity (mPa·s) |
|---|---|---|---|---|---|---|---|---|---|---|
| Example B-1 | B-1 | Daifloil #3 | 70 | KF96L-5cs | 30 | 40.6 | 52.0 | 622 | 150.0 | 29.69 |
| Example B-2 | B-2 | Daifloil #3 | 70 | KF96L-5cs | 30 | 40.6 | 55.0 | 859 | 148.2 | 18.15 |
| Example B-3 | B-3 | Daifloil #3 | 70 | KF96L-5cs | 30 | 40.6 | 48.0 | 3222 | 160.3 | 33.80 |
| Example B-4 | B-4 | Daifloil #3 | 70 | KF96L-5cs | 30 | 40.6 | 52.0 | 23600 | 110.0 | 47.92 |
| Example B-5 | B-5 | Daifloil #1 | 70 | KF96-20cs | 30 | 40.2 | 55.5 | <1 | 110.0 | 2.010 |
| Example B-6 | B-6 | Daifloil #1 | 50 | KF96-20cs | 50 | 33.1 | 55.5 | <1 | 101.3 | 3.500 |
| Example B-7 | B-7 | Daifloil #1 | 90 | KF96-20cs | 10 | 46.3 | 55.5 | <1 | 101.0 | 3.000 |
| Example B-8 | B-8 | Daifloil #1 | 50 | KF96-20cs | 50 | 33.1 | 55.5 | 12000 | 100.2 | 3.500 |
| Example B-9 | B-9 | Daifloil #1 | 90 | KF96-20cs | 10 | 46.3 | 55.5 | 12000 | 100.5 | 4.000 |
| Comp. Ex. b-1 | b-1 | — | 0 | KF96-20cs | 100 | 0 | 55.5 | <1 | Not measurable | Not measurable |
| Comp. Ex. b-2 | b-2 | Daifloil #1 + Demnum | 100 | KF96-20cs | 10 | 55 | 55.5 | <1 | 30.2 | 80.00 |
| Comp. Ex. b-3 | b-3 | — | 0 | KF96-20cs | 100 | 0 | 55.5 | 45000 | Not measurable | Not measurable |
| Comp. Ex/ b-4 | b-3 | Daifloil #1 + Demnum | 100 | KF96-20cs | 0 | 55 | 55.5 | 50000 | 23.2 | 90.00 |

The "not measurable" in the column of the results of evaluation of Comparative Examples b-1 and b-3 means that under the measured conditions, the dispersion of the electrorheological fluid was poor and reproducible measurement was not possible.

Examples of Application to Electric Devices with Narrow Gaps Between Electrodes

Example C-1

Production of Electric Device

Figure 8:
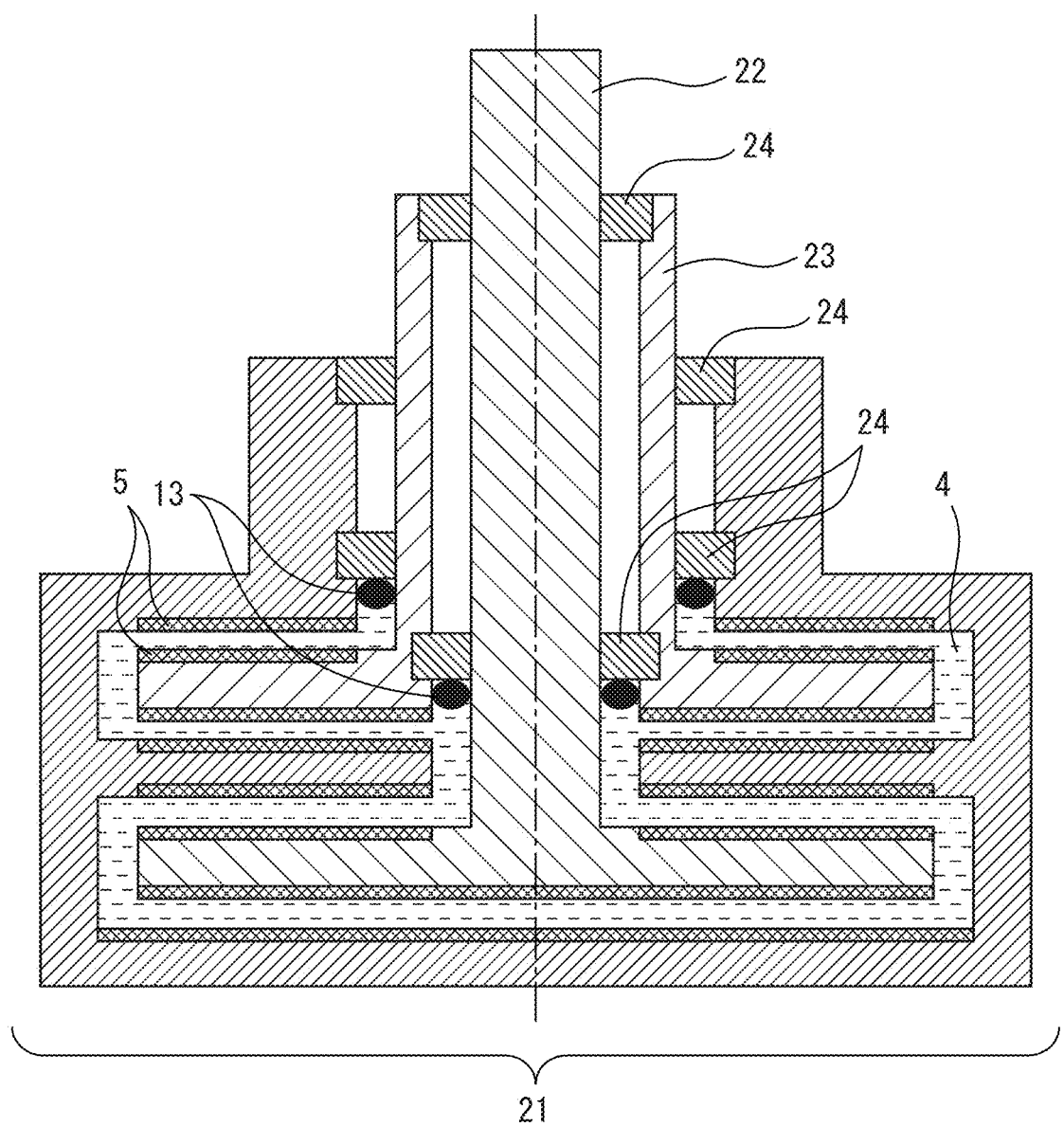
FIG. 8 is a conceptual view showing the structure of a disk type brake using an electrorheological fluid used in Examples C-1, C-2, and E-1, Comparative Example c-1, Reference Example e-1, and Reference Examples f-1 to f-4.
Figure 9:
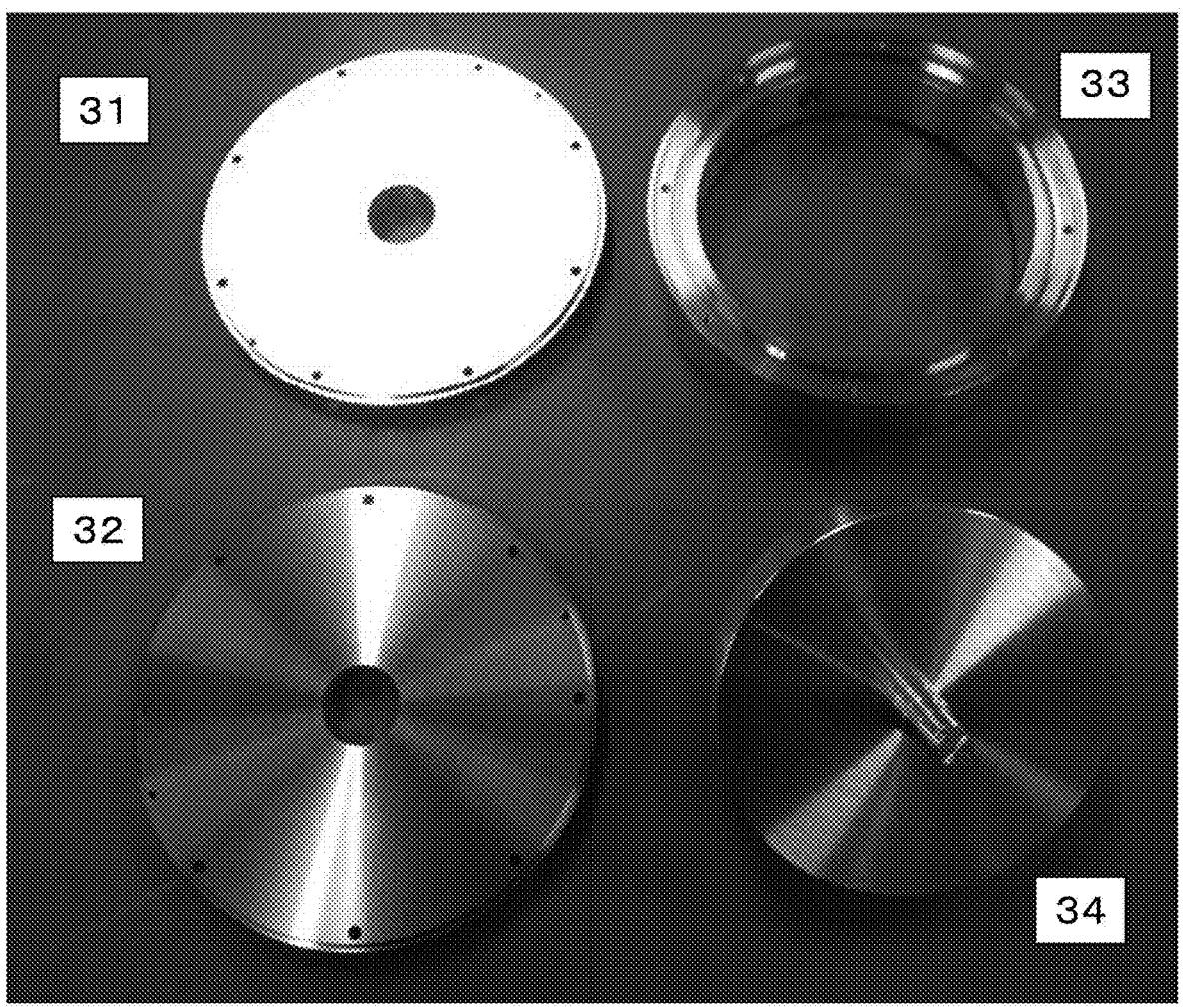
FIG. 9 is a photo of parts of a disk type brake used in Examples C-1, C-2, and E-1, Comparative Example c-1, Reference Example e-1, and Reference Examples f-1 to f-4 (before surface processing).

As the electric device, a disk type brake using an electrorheological fluid of the basic structure shown in FIG. 8 was fabricated. A photo of the parts used is shown in FIG. 9.

The side plates 31 and 32, main body ring 33, and inner disk 34 are all made of aluminum. The inside shaft (22 in FIG. 8) is made of stainless steel. At the inner disk 34, wiring is connected for applying high voltage from a high voltage terminal. At the side plate 31, low voltage side wiring is connected. The inner disk 34, side plates 31 and 32, and piston ring 12 are respectively insulated by plastic bearings. The gap between the inner disk 34 and side plates 31 and 32 and the main body ring 33 is 300 µm.

The electrorheological fluid (A-1) prepared in the above Example A-1 was filled from an injection hole formed in the main body ring 33.

The results of evaluation of the state when filling the electrorheological fluid are shown in Table 3.

Example C-2 and Comparative Example c-1

Except for respectively using each of the electrorheological fluids (A-2) and (a-1) prepared in the above Example A-2 and Comparative Example a-1 instead of the electrorheological fluid (A-1), the same procedure was performed as in Example C-1 to produce and evaluate an electric device. The results of evaluation are shown in Table 3.

In Comparative Example c-1, when trying to fill the electrorheological fluid (a-1) in the electrorheological fluid brake of FIG. 8, the ability of the fluid to penetrate between the electrodes was poor and fluid overflowed at the injection hole. For this reason, it was attempted to inject the fluid in a vacuum. As a result, compared even with the case of using the electrorheological fluid (A-1) in Example C-1, the amount of injection of fluid (vol) was about 9% smaller and instability was seen in the performance of the brake (brake force).

As shown in Table 3, the electrorheological fluid of the present invention could be easily injected even in a narrow electrode gap. The amount of entrainment of air was also small. Therefore, according to the present invention, it is possible to manufacture an electric device with a high reliability by a simple procedure.

Example of Application to Electric Device with Roughened Electrode Surface (1)

The arithmetic mean roughnesses (Ra) and the mean lengths (RSm) of the roughness curve elements of the plates used in Example D-1 and Reference Examples d-1 to d-4, and the insides of the main body ring 3 and the surface of the inner disk 4 used in Example D-2 and Reference Example d-5 were respectively measured under the following conditions:

Measuring device: made by KEYENCE, laser microscope, Model "VK-X250"
Power of object lens: 20×
λs: 25 µm
λc: 0.08 mm The obtained image was filtered using a VK-Analyzer (made by KEYENCE), then the arithmetic mean roughness (Ra) and mean length (RSm) of the roughness curve elements were determined based on JIS B 0601-2001 using a measured length of 550 µm.

Example D-1

Using styrene-divinylbenzene copolymer particles (ratio of divinylbenzene in copolymer=5 wt %) as a raw material, substantially the same procedure was used as in the above Example A-1 to introduce sulfonic acid groups, then substitute Na for the protons to prepare sulfonic acid group-containing polymer particles (weight ratio of sulfonic acid groups to sulfonic acid group-containing polymer: 52.3 wt %, content of chlorine atoms: 800 ppm, average particle diameter: 11 µm, water content: 1 wt %).

A fluid obtained by mixing a fluorine-based oil (Daifloil #3 made by Daikin Industries, Ltd.) and silicone oil (KF96-5cs made by ShinEtsu Chemical Co., Ltd.) to give a content of fluorine atoms in the fluid of 42 wt % was used as the dispersion medium.

The above polymer particles were uniformly dispersed in the dispersion medium to give a volume ratio of 40% to obtain an electrorheological fluid (D-1).

The ER effect of the electrorheological fluid (D-1) was investigated using as a measuring device a Model "G2000T-ER" dynamic viscoelasticity measuring device made by

TABLE 3

| | | Dispersion medium | | | | Results of evaluation | | |
| | | Fluorine-based oil | | Silicone oil | | | | State at time of injection of fluid | |
| | Name of electrorheological fluid | Type | Amount used (vol. ratio) | Type | Amount used (vol. ratio) | Weight ratio of fluorine atoms (wt %) | Base viscosity (mPa · s) | Ease of injection of fluid | Amount of fluid filled (ml) |
|---|---|---|---|---|---|---|---|---|---|
| Example C-1 | (A-1) | Daifloil #1 | 65 | KF96-20cs | 35 | 38.4 | 1396 | Easy | 6.8 |
| Example C-2 | (A-2) | Daifloil #1 | 70 | KF96-20cs | 30 | 40.2 | 1086 | Easy | 6.9 |
| Comp. Ex. c-1 | (a-1) | — | 0 | KF96-20cs | 45 | 0 | — | Fluid leakage from injection hole | 6.3 |

UBM Co., Ltd. This device injects the electrorheological fluid between the two top and bottom parallel plates and measures the shear stress when making the bottom plate rotate while changing the voltage applied across these plates.

As the material of the plate parts, SUS#304 was used. The facing surfaces of the top and bottom plates were respectively sandblasted using a particle size No. 40 (#40) polishing medium. The arithmetic mean roughness (Ra) of the plate surfaces after being roughened was 1.55 µm, while the mean length (RSm) of the roughness curve elements was 30.15 µm.

The electrode gap was made 0.3 mm and the shear rate was made 349 sec$^{-1}$.

The shear stress when injecting the electrorheological fluid (D-1) between the plates of the above device and applying a DC external electric field of 2 kV/mm was 2,518.5 Pa.

Reference Examples d-1 to d-3

Other than making the particle sizes of the polishing medium used when sandblasting the plate surfaces in the above Example D-1 respectively the ones described in Table 4, the same procedure was followed as in Example D-1 to measure the ER effects of each of the electrorheological fluids (D-1).

The measurement results were shown in Table 4 together with the arithmetic mean roughness (Ra) and the mean length (RSm) of the roughness curve elements of the plate surfaces.

Reference Example d-4

Other than polishing the plate surfaces to mirror finishes in the above Example D-1, the same procedure was followed as in Example D-1 to measure the ER effect of the electrorheological fluid (D-1).

The measurement results were shown in Table 4 together with the arithmetic mean roughness (Ra) and the mean length (RSm) of the roughness curve elements of the plate surfaces.

TABLE 4

| | Sandblasting | | | |
| --- | --- | --- | --- | --- |
| | Polishing material particle size | Ra (µm) | RSm (µm) | Shear stress (Pa) |
| Example D-1 | #40 | 1.55 | 30.15 | 2518.5 |
| Reference Example d-1 | #80 | 1.05 | 22.85 | 1349.8 |
| Reference Example d-2 | #120 | 1.00 | 20.48 | 1509.0 |
| Reference Example d-3 | #220 | 0.73 | 15.32 | 1587.7 |
| Reference Example d-4 | (Mirror polishing) | 0.42 | 23.00 | 1583.8 |

Alleviation of Slip-Stick Phenomenon

Example E-1

As an electric device, an electrorheological fluid brake was fabricated. This was connected to a Yamasaki type rotary torque meter. The slip-stick phenomenon (pulsation) was investigated when operating the brake from the rotational operation state. The Yamasaki type rotary torque meter converted the force transmitted by the shaft to the torsional angle of a measurement spring and displayed this as a white torque mark from the external slit window.

A photo of the parts of the brake is shown in FIG. 9. This brake is comprised of side plates 31 and 32, a main body ring 33, and an inner disk 34.

The inside of the main body ring 33 and the surfaces of the inner disk 34 were respectively sandblasted to form relief shapes of Ra: 2.88 µm, RSm: 42.7 µm. The gap between the inner disk 34 and the main body ring 33 (electrode gap) was set to 0.500 mm.

The above brake was assembled and the electrorheological fluid (D-1) prepared in the above Example D-1 was filled from the injection hole of the main body ring 33 to thereby fabricate an electrorheological fluid brake. At the inner disk 34, wiring is connected for applying high voltage from a high voltage terminal. At the side plate 31, low voltage side wiring is connected. These function as the electrodes in the electrorheological fluid brake.

Figure 10:
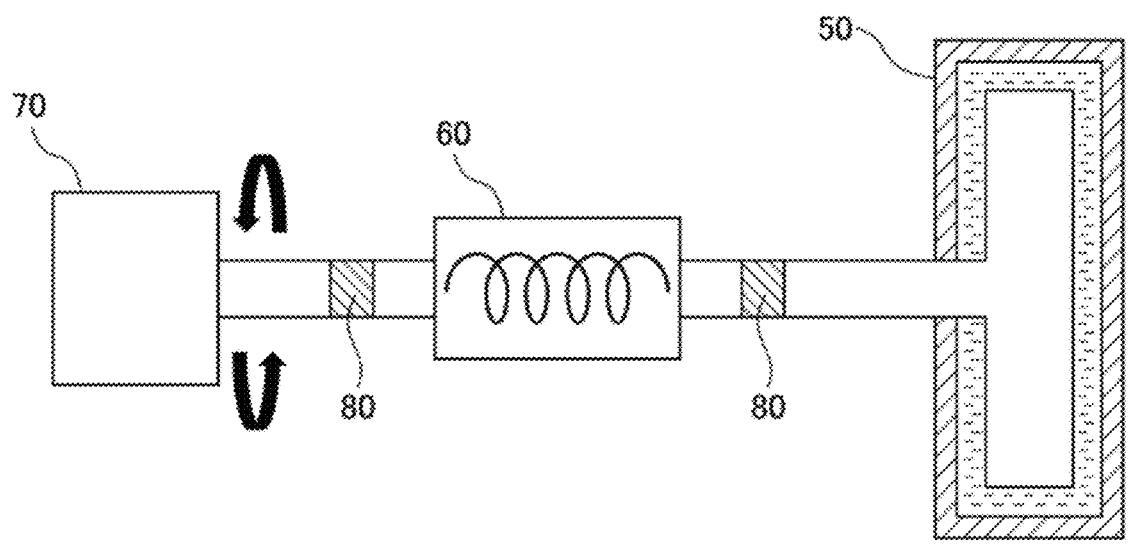
FIG. 10 is a schematic view showing the state of connection of an electrorheological fluid brake fabricated in Example E-1 and Reference Example e-1 to a Yamasaki type rotational torque meter.

A schematic view showing the state of connecting the electrorheological fluid brake fabricated as described above to a Yamasaki type rotary torque meter is shown in FIG. 10.

In FIG. 10, the electrorheological fluid brake 50 is connected through the Yamasaki type rotary torque meter 60 and two bearings 80 to the motor 70.

Without applying voltage across the electrodes of the electrorheological fluid brake 50, the motor 70 was made to rotate at a speed of 30 rpm. In this state, 1 kV/mm of voltage was applied across the electrodes of the brake 50 and the torque mark of the torque meter was observed, whereupon it was confirmed that no pulsation was seen and a constant torque value was exhibited.

Reference Example e-1

Other than not sandblasting the inside of the main body ring 33 and the surface of the inner disk 34 in the above Example E-1, the same procedure was followed as in Example E-1 to prepare and evaluate an electrorheological fluid brake. The extents of relief shapes on the inside of the main body ring 33 and the surface of the inner disk 34 were Ra: 0.42 µm and RSm: 23 µm.

As a result, it was learned that after applying voltage across the electrodes of the brake 50, pulsation by a certain frequency was seen and the torque value was unstable.

Example of Application to Electric Device with Roughed Electrode Surfaces (2)

Reference Example f-1

Sulfonic acid groups were introduced into styrene-divinylbenzene copolymer particles (copolymerization ratio of divinylbenzene=5 wt %), then the protons were substituted with Na to prepare sulfonic acid group-containing polymer particles (weight ratio of sulfonic acid groups with respect to sulfonic acid group-containing polymer of 52.3 wt %, average particle diameter of 11 µm, and water content of 2 wt %).

A fluid comprised of a viscosity 0.01 Pa·s fluorine-based oil (Daifloil #1 made by Daikin Industries, Ltd.) and a viscosity 0.02 Pa·s silicone oil (KF96-20cs made by ShinEtsu Chemical Co., Ltd.) mixed in a volume ratio of 65:35 (containing fluorine 38.4 wt % in the fluid) was made the dispersion medium.

The above polymer particles were uniformly dispersed in the above dispersion medium so that the volume ratio became 40% to thereby obtain the electrorheological fluid (f-1).

Production of Electric Device

As the electric device, an electrorheological fluid brake was fabricated. The voltage applied across the electrodes was changed while investigating the torque required for rotation of that brake. The structure of the brake fabricated here is the same as that fabricated in the above Example E-1.

In the Reference Example f-1, relief shapes were formed at the inside of the main body ring 33 and the surface of the inner disk 34 by sandblasting. A photo of the inner disk 34 after formation of the relief shapes and the surface relief profile drawn using a surface plotting function of the image analysis software ImageJ based on this photo are shown in FIG. 11.

This device was assembled and the above electrorheological fluid (f-1) was injected from the injection hole of the housing cylinder part 33.

Due to this relief shape processing, the gap between the electrodes changes from the set value. For this reason, the gap between the electrodes was calculated by finding the spatial volume between the electrodes from the weight and specific gravity of the injected electrorheological fluid and dividing it by the electrode areas (electrode areas before formation of relief shapes). As a result, the electrode gap in Reference Example f-1 was 0.506 mm.

Figure 14:
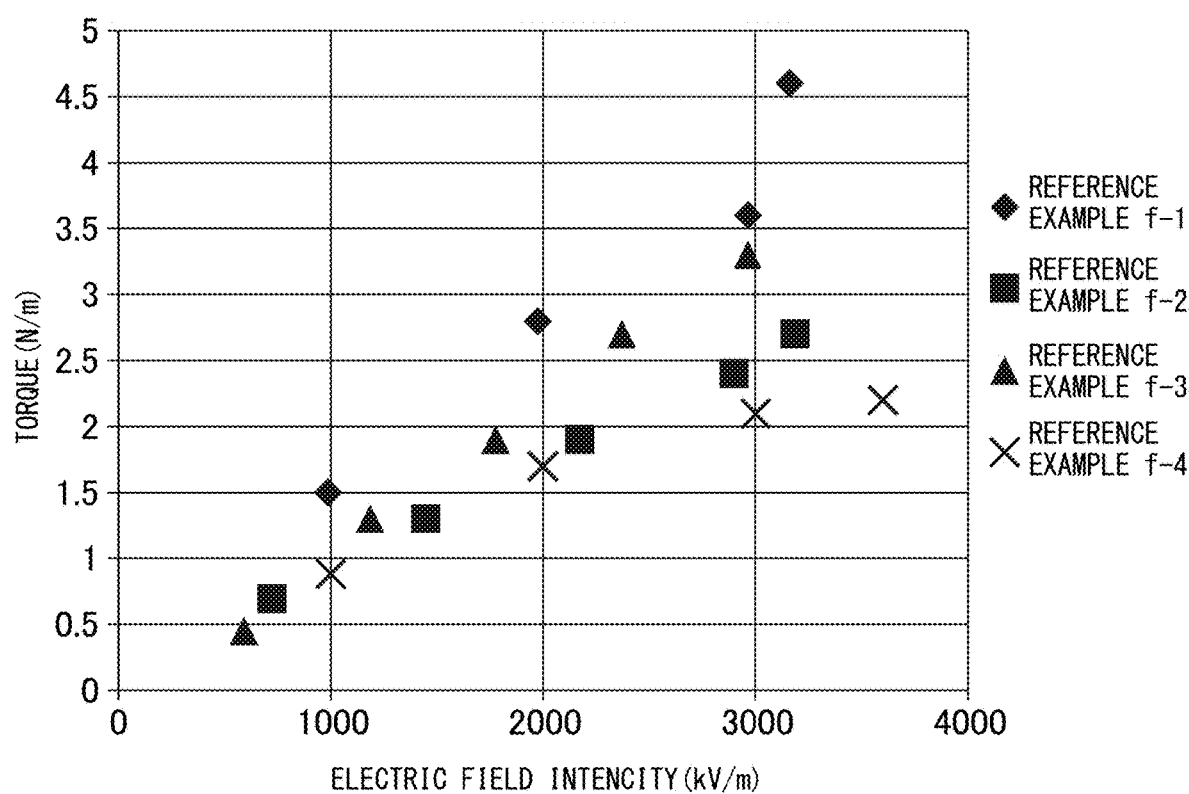
FIG. 14 is a graph plotting a torque against an electric field intensity measured in Reference Examples f-1 to f-4.

A voltage was applied across the electrodes in the brake fabricated as described above while changing its value. The electric field intensities at the different voltages and the torque values required for rotation of the inner disk 34 were measured. The values of the voltage, electric field intensity, and torque at this time are shown in Table 5 and a graph of the torque value plotted against the electric field intensity is shown in FIG. 14.

The brake of Reference Example f-1 dielectrically broke down with a voltage of 1,600V.

Reference Examples f-2 to f-4

Other than making the methods of forming the relief shapes those described in Table 5, the same procedures were followed as in Reference Example f-1 to assemble and evaluate electric devices (brakes) until they dielectrically broke down.

Photos of the inner disk 34 after etching in Reference Examples f-2 and f-3 and relief shape profiles obtained from the photos are shown in FIG. 12 and FIG. 13.

The results of evaluation are shown in Table 5 and FIG. 14. The maximum value in the "Voltage" column of Table 2 is the dielectric breakdown voltage.

TABLE 5

| | Method of formation of relief shapes | Gap between electrodes (mm) | Voltage (V) | Field intensity (kV/m) | Torque (Nm) |
|---|---|---|---|---|---|
| Reference Example f-1 | Sand-blasting | 0.506 | 500 | 988 | 1.5 |
| | | | 1000 | 1976 | 2.8 |
| | | | 1500 | 2964 | 3.6 |
| | | | 1600 | 3164 | 4.6 |
| Reference Example f-2 | Etching | 0.690 | 500 | 724 | 0.69 |
| | | | 1000 | 1449 | 1.3 |
| | | | 1500 | 2173 | 1.9 |
| | | | 2000 | 2897 | 2.4 |
| | | | 2200 | 3187 | 2.7 |
| Reference Example f-3 | Etching | 0.844 | 500 | 593 | 0.45 |
| | | | 1000 | 1185 | 1.3 |
| | | | 1500 | 1778 | 1.9 |
| | | | 2000 | 2370 | 2.7 |
| | | | 2500 | 2963 | 3.3 |

TABLE 5-continued

| | Method of formation of relief shapes | Gap between electrodes (mm) | Voltage (V) | Field intensity (kV/m) | Torque (Nm) |
|---|---|---|---|---|---|
| Reference Example f-4 | None | 0.500 | 500 | 1000 | 0.88 |
| | | | 1000 | 2000 | 1.7 |
| | | | 1500 | 3000 | 2.1 |
| | | | 1800 | 3600 | 2.2 |

Compared with Reference Example f-4 in which the electrode surfaces are not formed with relief shapes, it is learned that the brakes of Reference Examples f-1 to f-3 given relief shapes on their surfaces are higher in torque values at the same electric field intensities and have electrorheological effects effectively expressed. Among these, the brake of Reference Example f-1 obtained by sandblasting was verified to be higher in electrorheological effect compared with the brakes of Reference Examples f-2 and f-3 obtained by etching.

INDUSTRIAL APPLICABILITY

The electric device of the present invention can, for example, be utilized for a device for an automobile, a virtual reality haptic device, a prosthetic arm or prosthetic leg, or an assist robot. Among these, application to a virtual reality haptic device, for example, a game, equipment for rehabilitation use, a training apparatus, or a rehabilitation robot is suitable.

REFERENCE SIGNS LIST 1. brake
2. fixed cylinder
3. rotary cylinder
4. electrorheological fluid
5. electrode
6. clutch
7. input rotary cylinder
8. output rotary cylinder
9. damper
10. tubular cylinder
11. piston
12. piston ring
13. seal
14. piston shaft
15. piping
16. parallel plate type valve
17. arm
18. grip
19. X-axis arm
20. Y-axis arm
21. coaxial twin brake
22. inside shaft
23. outside shaft
24. insulating bearing
25. PC
26. bass fishing game displayed on monitor
27. patient
31. side plate
32. side plate
33. main body ring
34. inner disk
50. electrorheological fluid brake
60. Yamasaki type rotary torque meter
70. motor
80. bearing

The invention claimed is:

1. An electrorheological fluid comprising:
a dispersion medium containing fluorine atoms in an amount of 38.0 wt % or greater and 41.0 wt % or smaller in which
particles for electrorheological fluid containing a sulfonic acid group-containing polymer having a content of sulfonic acid groups of 30 wt % or greater and 70 wt % or smaller are contained in an amount of 10 vol % or greater and 50 vol % or smaller with respect to the total volume of the dispersion medium and the particles, wherein
the dispersion medium is a mixed medium of
a fluorine-based oil selected from a group consisting of a low polymer of ethylene trifluoride, a perfluoro polyether oil, and a fluorine-modified silicone oil; and
a silicone oil,
the sulfonic acid group-containing polymer has a sulfonated aromatic structure, and
the particles for electrorheological fluid are selected from a group consisting of
particles consisting of the sulfonic acid group-containing polymer; and
particles comprised of cores of porous polymer particles or porous silica particles, and the sulfonic acid group-containing polymer coated on the surfaces of the cores, wherein
the electrorheological fluid exhibits an electrorheological effect X expressed by the following formula (1):

$$X = S_1/S_0 \quad (1)$$

in which formula (1) X is 140 or greater, $S_1$ is the shear stress when applying a 3.0 kV/mm electric field, while $S_0$ is the shear stress when not applying an electric field).

2. The electrorheological fluid according to claim 1, wherein the sulfonic acid group-containing polymer has a sulfonated aromatic structure.

3. The electrorheological fluid according to claim 1, wherein the content of the chlorine atoms in the particles for electrorheological fluid is 5,000 ppm or smaller.

4. The electrorheological fluid according to claim 1, wherein the content of the chlorine atoms in the particles for electrorheological fluid is 1 ppm or greater.

5. Particles for electrorheological fluid containing a sulfonic acid group-containing polymer, in which particles for electrorheological fluid,
the content of the sulfonic acid groups in the particles for electrorheological fluid is 30 wt % or greater, and
the content of the chlorine atoms in the particles for electrorheological fluid is 1 ppm or greater and 5,000 ppm or smaller.

6. An electrorheological fluid comprised of a dispersion medium containing fluorine atoms in which particles according to claim 5 are contained.

* * * * *